United States Patent
Thumm et al.

[19]
[11] Patent Number: 6,159,442
[45] Date of Patent: Dec. 12, 2000

[54] USE OF MULTIPLE STREAM HIGH PRESSURE MIXER/REACTOR

[75] Inventors: Jeffrey R. Thumm, Norfolk; Michael A. Lento, Melrose; Jerome S. Higgins, Concord, all of Mass.; David Lassen King, Mountain View, Calif.; David Mark Ginter, Brentwood, Calif.; Laurent DAny Kieken, Menlo Park, Calif.

[73] Assignee: MFIC Corporation, Newton, Mass.

[21] Appl. No.: 09/129,294

[22] Filed: Aug. 5, 1998

Related U.S. Application Data

[63] Continuation-in-part of application No. 08/906,446, Aug. 5, 1997.

[51] Int. Cl.[7] .................................................. C01B 3/12
[52] U.S. Cl. .................... 423/659; 239/420; 239/433; 366/162.4; 422/133; 423/328.1; 423/430; 423/493; 423/600; 502/341; 502/346

[58] Field of Search ............................ 423/328.1, 328.2, 423/330.1, 430, 420.2, 659, 493, 600; 502/235, 244, 250, 84, 8, 252, 341, 346; 422/224, 131, 132, 133; 239/310, 420, 434, 435; 137/3; 366/159.1, 132

[56] References Cited

U.S. PATENT DOCUMENTS

| | | | |
|---|---|---|---|
| 4,113,843 | 9/1978 | Mirsky et al. | 423/329 |
| 5,246,899 | 9/1993 | Bhattacharyya | 502/84 |
| 5,615,949 | 4/1997 | Morano et al. | 422/133 |

*Primary Examiner*—Gary P. Straub
*Attorney, Agent, or Firm*—Bruce F. Jacobs

[57] ABSTRACT

Processes for use of a controlled continuous high pressure multiple reactant streams flowing into a chemical mixer/reactor. Individual reactant streams are pressurized to about 8,000 to 50,000 psi and achieve velocities up to about 250 meters/second in the final stage of the chemical mixer/reactor.

8 Claims, 12 Drawing Sheets

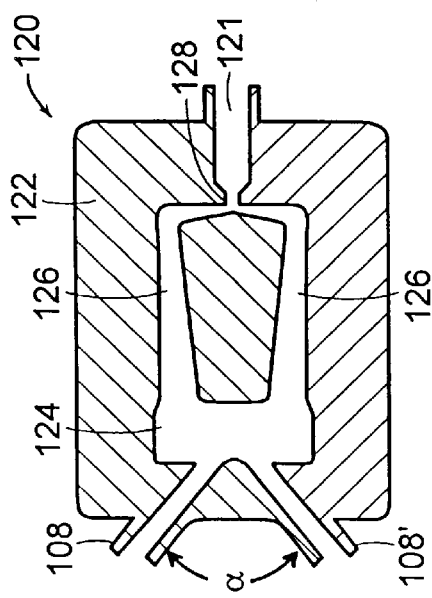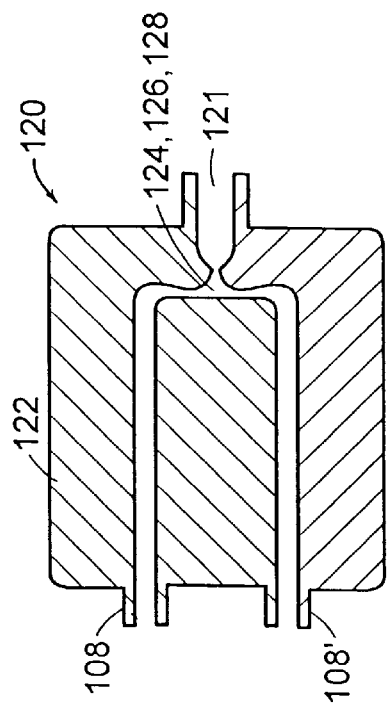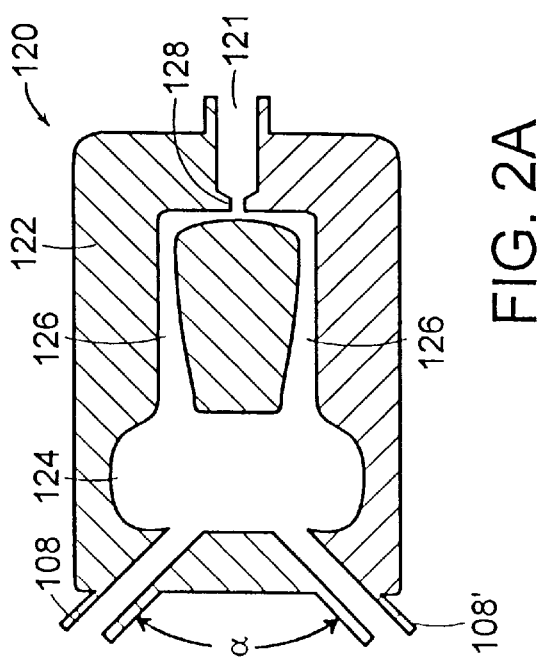

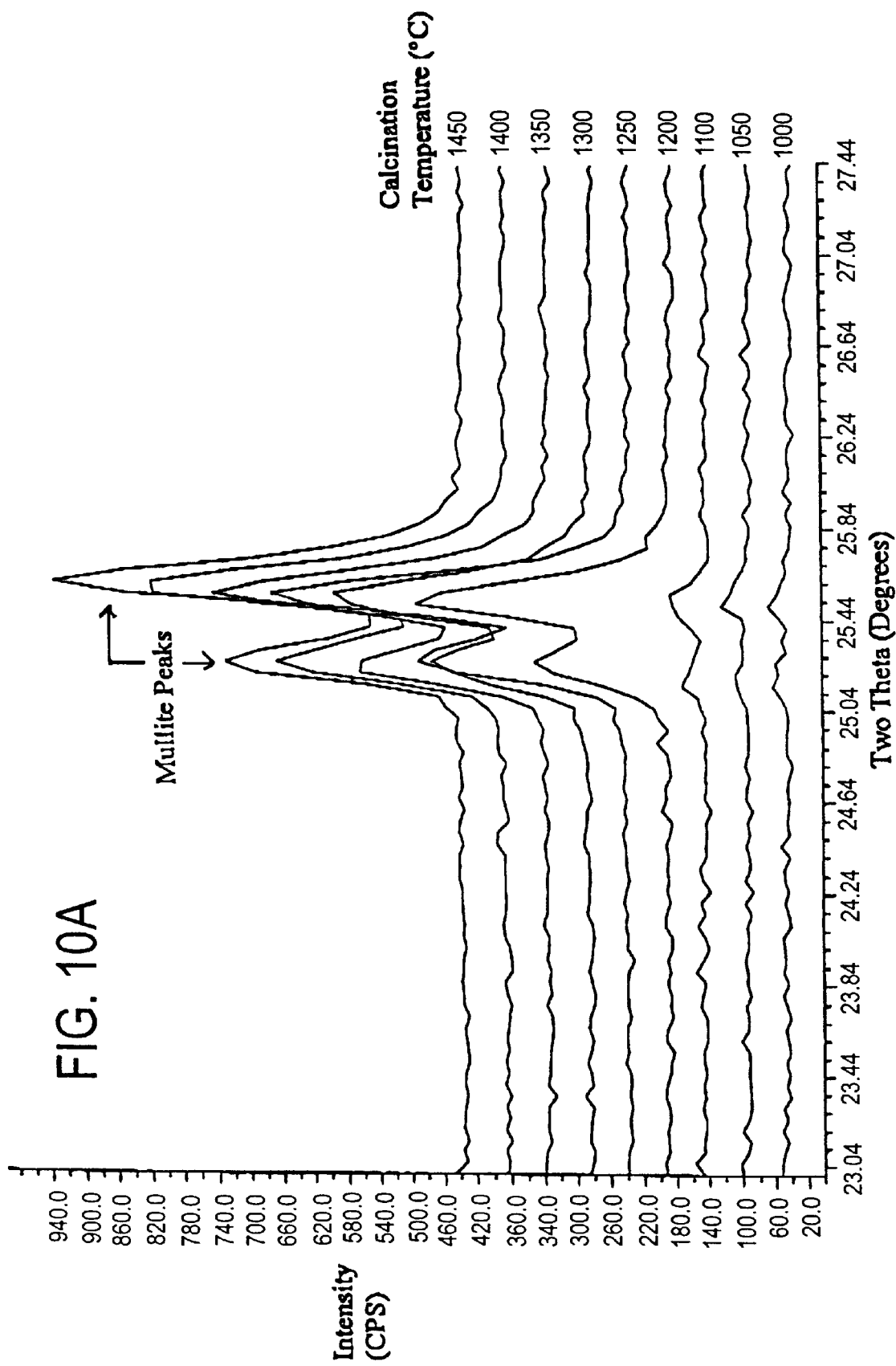

USE OF MULTIPLE STREAM HIGH PRESSURE MIXER/REACTOR

CROSS REFERENCE TO RELATED APPLICATION

This application is a continuation-in-part of U.S. Ser. No. 08/906,446, filed Aug. 5, 1997.

FIELD OF THE INVENTION

The present invention is directed to a continuous high pressure multiple discrete stream chemical mixer/reactor and its use, particularly for performing irreversible reactions, e.g. precipitation and nucleation reactions.

BACKGROUND OF THE INVENTION

If multiple streams of chemical reactants are combined with less than optimum mixing, less than acceptable output product compositions may result. Examples of such compromised output products include non-uniform seed precipitation products, incompletely reacted source materials, isolation of unreacted source material by reacted product, liquid striation, and the like. Mixing effects are particularly significant in high reactivity or low diffusivity systems where concentration inhomogeneities cannot be leveled off before appreciable reaction occurs. Some reactions in low viscosity systems are fast enough, relative to conventional mixing, that conversion occurs in a region or reaction zone where partial segregation of the reactants causes steep concentration gradients which can result in a reduced reaction rate relative to perfect mixing.

A stirred tank, e.g. an autoclave, is the most widely used industrial chemical reactor type, accounting for about 50% of the world's chemical production in terms of value. However, a stirred tank reactor has several limitations, especially when used to perform fast chemical reactions. The flow field is inhomogeneous and generally of low intensity and the predominant flow pattern is back-mixing, making scale-up difficult due to the complexity of the flow. This often leads to large scaling ratios, i.e. due to inefficiencies in mixing more source materials are required to obtain a desired output quantity.

Accordingly, there is a need for a chemical mixer/reactor which can overcome these and related problems, particularly for continuous reactions which entail the precipitation of sparingly soluble materials from two or more liquid ionic solutions and subsequent crystallization, i.e. nucleation and growth of crystals, of the reaction product. With conventional mixing the resulting solid product usually has a wide crystal size distribution which determines the filtration, washing, settling abilities of suspensions, and thus the quality, e.g. crystal size homogeneity, surface area, and the like, of the resulting product.

With the present invention, control and optimization of the macromixing, mesomixing, and micromixing parameters for a particular reaction allows preparation of uniform output products with consistent, uniform quality. "Macromixing" refers to the general distribution of an additive or reactant on a coarse scale in a mixer via turbulent dispersion. In the continuous system of this invention, global axial macromixing can be characterized by a residence time distribution and global radial macromixing by a coefficient of variation. "Mesomixing" refers to mixing at an intermediate scale between macromixing and micromixing. Mesomixing results in a reduction of the scale of segregation between reactants, i.e. feed eddies are reduced in size to small "engulfment" sized eddies. "Micromixing" refers to the final stages of mixing (engulfment in small eddies and molecular diffusion) which brings together liquid reactants on a molecular scale.

It is also known that mixing can dramatically affect the properties of the final product of a chemical reaction, particularly a precipitation reaction. As a result, U.S. Pat. Nos. 5,417,956 and 5,466,646 disclose methods of producing nanosize particles by use of the emulsion forming apparatus of U.S. Pat. Nos. 4,533,254 and 4,908,154. The process entails premixing two liquids which react with each other and then subjecting that single premixture to high pressure and a subsequent high energy mixing process, i.e. high shear, preferably using a Microfluidizer® device, to generate nanosize particles. It has now been recognized that for a precipitation reaction, the reaction kinetics are such that significant precipitate nucleation and reaction will have occurred during the premixing, well prior to introduction of the mixture into the high energy mixing zone. As a result, the nuclei formed in the premixture are less uniform than when the mixing/reacting is performed with the apparatus of the present invention. It is now believed that the predominant mode of operation of the Microfluidizer® device is breaking up precipitant material to produce smaller particles, rather than direct control of the size of the precipitant material during its initial formation. The present invention produces nanosize product particles of a smaller, more uniform size distribution that enhances use of the products for various applications, including in the field of catalysis.

In a Microfluidizer® device a single hydraulically-driven intensifier is moved in an axial reciprocating stroke to pressurize and process a single stream of pumpable fluid. No matching of flows of two or more different fluid streams, nor use of separate high pressurizing pumps for each different fluid stream, nor flow control of multiple streams are required.

Control of the flow of two or more pumpable fluid source materials, both individually and in relation to each other, at high pressure is critical to the present invention. At low pressures, up to a maximum of about 5,000 psi, as used in hydraulically-driven systems, flow control is obtainable with proportional control valves. However, at the reactant stream pressures used in the present invention, i.e. about 8,000 psi and above, control valves and materials are not available to provide the required degree of flow control for the low viscosity fluids used herein. While gear pumps have been used to extrude high viscosity thermoplastic materials at pressures up to 30,000 psi, they are not useful with the low viscosity source material streams of the present invention. The low viscosity streams would push past the gear-to-housing seals and the gear pumps could not provide adequate flow regulation. Moreover, even making flow measurements at pressures above 5,000 psi exceeds the capability of many conventional fluid flow techniques. Moving part techniques such as rotating vane pick-ups, mass flow meters such as hot wire dissipation, transient measurement techniques such as orifice flow meters, and flow meters using ultrasonic transducers all encounter serious technologic barriers in the high pressure environment of this invention.

It is an object of the present invention to create a continuous mixer/reactor wherein macromixing, mesomixing, and micromixing parameters can be varied and controlled so that the output product will have intended characteristics and be of uniform quality.

It is a further object of the present invention to create a continuous mixer/reactor wherein the proportions and weights of two or more source materials at high pressure are monitored and controlled.

It is a further object of the present invention to create a continuous chemical mixer/reactor which will provide increased control over the nucleation stage of a precipitation reaction as compared to conventional reactors so as to enhance overall product quality by directly producing products having generally one or more of smaller crystallite sizes (without the need for any grinding or milling operation), a more uniform chemical composition, a narrower distribution of crystallite or particle sizes, and/or previously unobserved phases and crystallite morphologies.

It is a still further object to create a chemical mixer/reactor which can allow reactants to react sufficiently rapidly to enhance the selectivity of the reaction to generate more desirable products as opposed to less desirable ones.

Other objects of the invention will be evident from the ensuing detailed description of this invention.

SUMMARY OF THE PRESENT INVENTION

The multiple stream high pressure continuous chemical mixer/reactor of this invention comprises in combination (i) means for individually pressurizing each of two or more different liquid source material streams to high pressure; (ii) means for individually monitoring the flow of each liquid source material stream; (iii) a reaction chamber for receiving the pressurized liquid source material streams at high velocity; (iv) means for discharging a product stream which results from mixing of the pressurized liquid source material streams at high pressure and high velocity in the reaction chamber; and (v) means for controlling the rate of delivery of each reactant stream to the reaction chamber at a determined continuous stoichiometric rate.

The multiple stream high pressure mixer/reactor is controlled by a closed loop control means combining individual stream transducers to allow calculation of flow of each stream, computer hardware with control system application software, a hydraulic pressure/flow metering valve for each stream, and input/output connections to the computer hardware for the transducer data and meter valve drive. Each reactant stream is pressurized by a hydraulically-driven intensifier. A hydraulic pump pressures a hydraulic fluid which drives a hydraulic cylinder which in turn drives a multiplier piston or plunger of the intensifier. The hydraulic pressure-flow metering valve regulates the intensifier's hydraulic drive, thereby regulating the pressure and flow of each reactant stream. Transducers along each stream sense pressure. Preferably through an interactive proportional-integral-differential (PID) error minimizing control loop, the flow of each reactant stream is regulated to variable set points to maintain continuous flow at the specified levels. The individual reactant streams then enter and first meet within the mixer/reactor chamber or mixing valve at high velocity where controlled macromixing, mesomixing, and micromixing occur.

BRIEF DESCRIPTION OF THE DRAWINGS

FIGS. 2A, 2B, and 2C are schematic cross-sectional diagrams of alternative reaction chambers useful to obtain different degrees of molecular mixing, depending upon the reactivities of the starting reactants.

FIGS. 10A and 10B are x-ray spectra of the products of Example 3 and Comparative Example 3A, respectively.

DETAILED DESCRIPTION OF THE INVENTION

Figure 1:
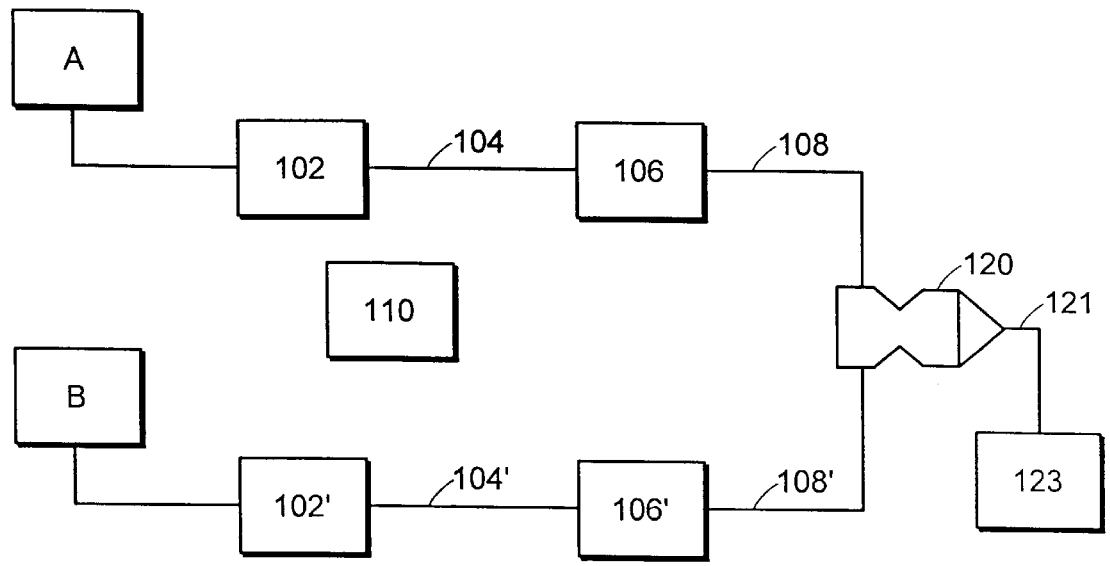
FIG. 1 is a schematic diagram of a general dual stream high pressure chemical mixer/reactor of this invention.

FIG. 1 is a schematic drawing of a dual stream high pressure continuous chemical mixer/reactor of this invention. Liquid source material A is delivered by a high pressure pump 102 through piping 104. Simultaneously, liquid source material B is delivered by a high pressure pump 102' through piping 104'. Each of the source materials has a low viscosity, generally about 0.25 to 500 centipoise at room temperature, although higher or lower viscosities can be used provided that the source material is pumpable. Generally, suitable liquid source materials will have densities in the range of about 0.7 to about 2 g/cc. The term "liquid" is used herein to include not only single phase liquid materials, but also two-phase liquid materials containing solid particles dispersed therein. The pumps generally pressurize each of the source materials to a pressure in the range of about 8,000 to 50,000 psi and even higher. Preferably the minimum pressure is at least 10,000. More preferably it is at least 15,000, psi.

The high pressure pumps 102 and 102' may be any type, including turbine, gear, piston or plunger pumps, and may have single or multiple rotors, pistons, or plungers. For controllability, reliability, and to permit a wider pressure/flow dynamic range, pneumatic or hydraulic pump driving means are preferred over direct or gear driven electric motor drives. Piston and plunger pumps having simple geometries can be assembled from simple components which leads to better reliability through fewer and less complicated parts and also to more gentle and predictable handling of a source material. Thus piston or plunger pumps are currently preferred over turbines and other rotating pumps.

Standard industrial pneumatic sources are generally limited to between 90 and 110 psi as higher pressures are considered hazardous unless significant input filters and output controls are in place. To achieve an output pressure of 10,000 psi with a pneumatic-driven pump requires a multiplier of 100:1. Thus a 100 psi pneumatically driven piston area would need to be excessively large (typically >100 square inches) to produce a source material flow higher than around 100 milliliters per minute (ml/min) at 10,000 psi.

With standard components, hydraulic oil can be safely and effectively pressurized and hydraulic pressure can be controlled at pressures up to about 5,000 psi and to control flows at several tens of liters per minute. To produce a source material pressure of 50,000 psi, the approximate current upper limit of well-designed practical flowing stream industrial processors, a hydraulically driven pump must have a multiplier of only 10:1. Combining this higher safe operating pressure with easily obtained controllability, higher reliability, and an inherent wider dynamic range, hydraulically driven pumps are preferred over pneumatic or direct electrically-driven pumps.

The most preferred high pressure pumps 102 and 102' are piston or plunger pumps driven by a pressurized hydraulic source. In this invention, the piston or plunger pumps are termed "intensifiers" because of their multipled pressure output. Generally hydraulically-driven intensifiers used in this invention have a multiplier ratio (based upon the ratio of piston/plunger surface areas) of about 3:1 to about 20:1, preferably about 5:1 to about 15:1. Most preferably the multiplier ratio is about 11:1 wherein every 1,000 psi of hydraulic pressure pressurizes a reactant stream to 11,000 psi.

The flow of source materials A and B continue, through flowmeters 106 and 106' respectively. Data about the flow levels are continuously transmitted to a controller 110. The controller 110 compares the input data received from the flowmeters 106 and 106' with set point information and exports instructions to continuously vary the drives to each pump 102 and 102' as necessary such that the measured flow of each source material stream i<; at an operator selected rate, the specific value of which will depend upon the operation being performed.

Flow regulated source material A continues through piping 108 and flow regulated source material B continues through piping 108' until the streams meet in a reaction chamber 120 from which a product emerges through discharge means 121 into storage container 123. The reaction chamber 120 allows for specific stages of macromixing, mesomixing, and micromixing to efficiently and effectively introduce the molecules of source material A to those of source material B. Given that a particular reaction chamber has a fixed geometry, the residence time and intensity of the mixing can be controlled within a single reaction chamber design by varying the incoming pressures of the source materials. The physical mixing zones within the chamber may also be varied to accomplish different residence times/ mixing intensities for a given pressure or flow.

The use of a relatively large passageway cross section in a reaction chamber or relatively low pressures will increase the total mixing time by reducing the velocity of the streams, thereby increasing the residence time within a fixed geometry. This will increase the time allowed for macromixing, mesomixing, and micromixing, and effect the final properties of the resulting product. Alternatively, smaller passageway cross sections and/or relatively higher pressures can be used to increase the velocity of the streams, thereby reducing the time available for macromixing, mesomixing, and micromixing.

Some examples of alternative reaction chambers can be seen in FIG. 2. The reaction chambers of FIGS. 2A and 2B contain successive zones of reducing volume and changing geometry. In FIG. 2A, for example, a reaction chamber 120, located within a body 122, contains a macromixing zone 124, a mesomixing zones 126, and a micromixing zone 128. Source material A enters the reaction chamber 120 through piping 108 and source material B symmetrically enters the reaction chamber 120 through piping 108', generally at substantially equal, i.e. within about ±3%, entering pressures so that the two streams first meet in the macromixing zone 124 at an angle of . Although the angle  may range from about 10° to about 350°, it is more commonly about 20 to 180° and preferably about 30° to 120°. The specific angle particularly effects the degree of initial mixing, i.e. macromixing, since in general, larger angles produce greater initial mixing. Then the macromixed material passes through a generally increasingly turbulent smaller cross sectional area, i.e. mesomixing zone 126, before two still narrower streams of the macro- and mesomixed material collide with each other in a highly turbulent micromixing zone 128 before exiting the reaction chamber 120 through the discharge means 121.

When source materials A and B first meet in the macromixing zone 124 of the reaction chamber 120, the materials are generally traveling at a velocity of about 1.5 to 20 or higher, preferably about 3 to 12, meters per second (m/s). Through the mesomixing zone 126, the combined material is generally travelling at a velocity of from about 5 to 50 m/s or higher, preferably from about 10 to 25 m/s. When the combined material reaches the micromixing zone 128, it is traveling at speeds of from about 100 to 500 m/s or higher, preferably from about 250 to about 350 m/s.

The material resident time in the macromixing zone 124 is generally from about 0.5 to about 1 millisecond (ms), preferably from about 0.8 to about 0.9 ms. The material resident time in the mesomixing zones 126 is generally from about 5 to 50 microsecond ($\mu s$), preferably from 10 to 20 $\mu s$. The material resident time in the micromixing zone 128 is generally from about 2 to 20 $\mu s$, preferably from 5 to 10 $\mu s$. It is in the highly turbulent, microgeometry of the micromixing zone 128 that extreme molecular level mixing occurs which assures the highest level of source materials A and B mixing possible.

Alternatively, as shown in FIG. 2B, the source material A enters a smaller macromixing zone 124 of a reaction chamber 120 through piping 108 and the source material B enters the same macromixing zone 124 through piping 108' so that the two materials first meet in the reaction chamber at a larger angle  than in FIG. 2A. Then the macromixed material passes through a generally increasingly turbulent mesomixing zone 126 before two streams of the mesomixed material are caused to collide in a highly turbulent micromixing zone 128, prior to the product exiting through discharge means 121.

For extremely fast reactions, e.g. those which are complete in mere picoseconds, the reaction chamber shown in FIG. 2C may be more suitable. Again, the source material A enters the reaction chamber 120 through the piping 108 and the source material En enters through the piping 108'. Then the two materials first come into contact with each other by colliding within the reaction chamber 120. In this case, the macromixing, mesomixing, and micromixing zones 124, 126, and 128 are substantially indistinguishable and the materials are each traveling at speeds of from about 100 to 500 m/s or higher, preferably from about 250 to about 350 m/s, when they first meet. The velocity of the mixture may then increase during discharge through a relatively narrower exit into discharge means 121.

Figure 3:
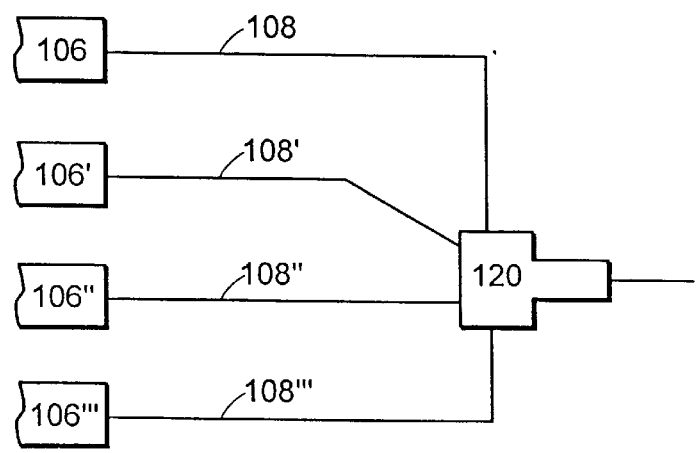
FIG. 3 is a partial schematic diagram of a variation of the mixer/reactor of FIG. 1 having four reactant streams.

While the above general description of this invention refers to using two source materials A and B, three or more source material streams may be utilized. FIG. 3 is a partial schematic drawing in which four source materials are shown exiting flowmeters 106, 106', 106", and 106'" into piping 108, 108', 108", and 108'", respectively, and then entering reaction chamber 120 through four separate entry ports. The multiple source materials enter the generally symmetrical reaction chamber at generally substantially equal (±about 3%) entering pressures so that the streams have matched velocities (assuming an equivalent density). A third source material stream may be the same as one of source material streams A and B. For example, if the stoichiometry of a reaction requires 2 parts A and one part B and the two have similar densities, then it may be easier to accomplish the necessary flow control by having 2 streams of A and one stream of B fed into the reaction chamber. Alternatively, the third (or more) source material stream may be different from A and B.

Figure 4:
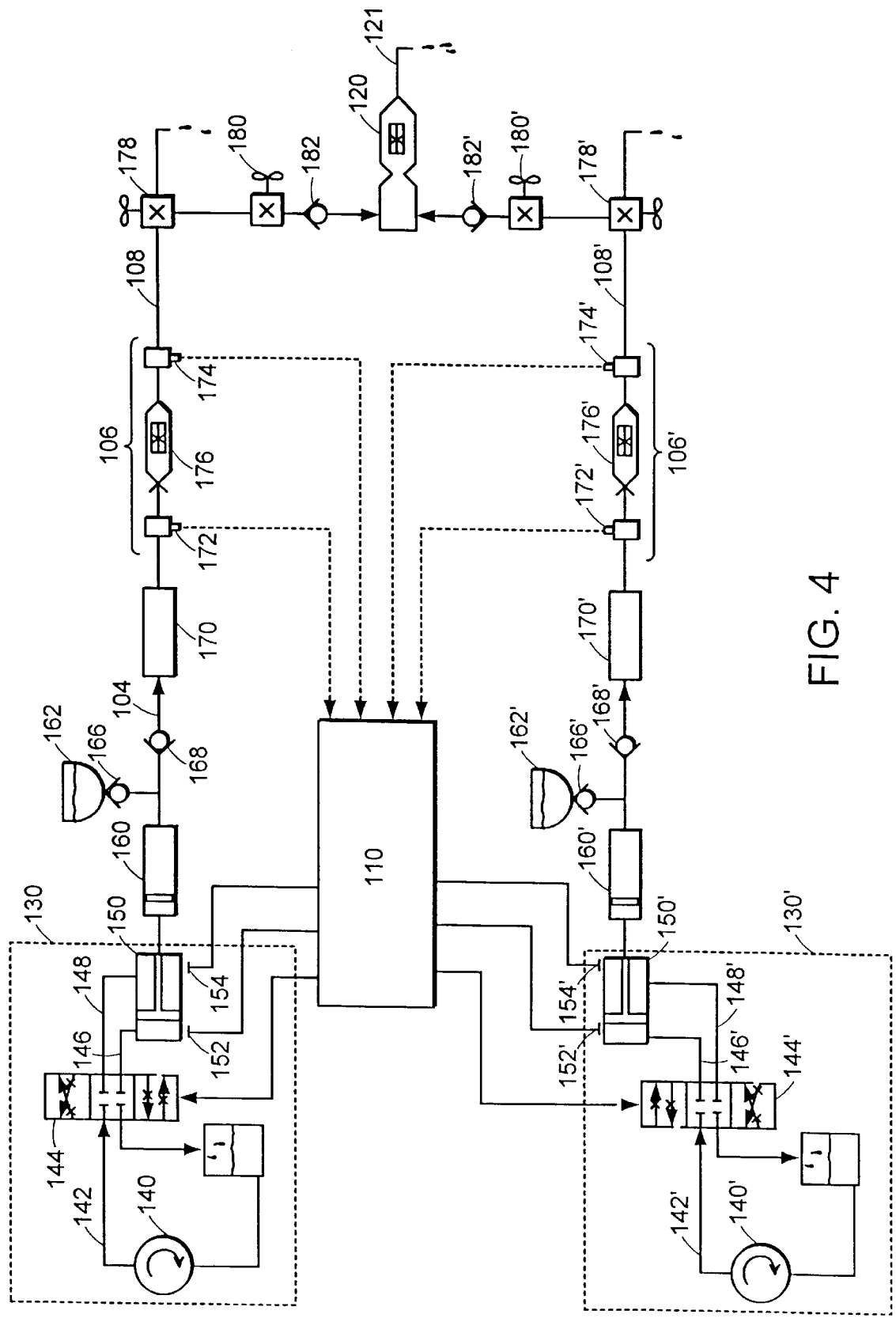
FIG. 4 is a detailed schematic diagram of a preferred dual stream mixer/reactor of this invention utilizing a single piston hydraulic pump for pressurizing each stream.

A first preferred dual stream embodiment of the present invention is shown in FIG. 4 wherein separate single piston hydraulic pumps are used to deliver each source material A and B to the high pressure reaction chamber. In each of the hydraulic circuits 130, 130', a hydraulic pump 140, 140' drives hydraulic oil to a pressure of about 1,000 to 5,000 psi, preferably about 2,000 to 4,000 psi, through a pipe 142, 142' and a directional proportional control valve 144, 144' which routes the flow of the hydraulic oil through either line 146, 146' or line 148, 148', alternately driving hydraulic piston 150, 150' back and forth. Limit switches 152, 152' and 154, 154' at either end of the hydraulic pistons 150, 150' sense end travel of the piston and transmit this information to the single controller 110. The directional proportional control valves 144, 144' change the direction of the hydraulic flow. The valves 144, 144' contain a variable, controllable restriction which permits variation of the pressure drop across them so that the pressure delivered to the hydraulic pistons 150, 150' can be varied. By means of the directional proportional control valves 144, 144', the hydraulic drive to the piston is controlled from 0 to the maximum limit of the hydraulic pump in both directions.

The hydraulic pistons 150, 150' drive source material pistons 160, 160' back and forth, alternately filling the source material pistons 160, 160' with source materials A or B from reservoirs 162 or 162' respectively and pressurizing the source material to cause flow thereof. The hydraulic piston to source material piston ratio may be varied from about 1:5 to 1:20. Check valves 166, 166' prevent high pressure blowing of source materials A and B out of the source reservoirs 162 and 162'. The pressurized source materials flow through check valves 168, 168' and into pressure energy accumulators (flow dampeners) 170, 170' which maintain a positive pressure and source material flow during the source material piston fill strokes. Single piston pumps require that a portion of the processing time be used to fill the piston cylinder with a source material and a portion of the processing time to deliver that source material. Without appropriately sized accumulators the flow from a single piston pump can not be controlled better than about ±15%, but with accumulators the flows can be controlled within about ±3%. No accumulators are necessary when using multiple piston or plunger pumps or continuous pressure sources. Suitable accumulators include both in-line and side stream perpendicular leg vessels or tubing. The volume within an accumulator must be sufficiently large in volume to maintain flow throughout the fill stroke. As such the size of an accumulator is directly related to both the volume of the pump stroke and the pressure generated.

Stable and controllable flow of each source material is obtained by fixed restrictions 176, 176' in flow meters 106 and 106' which effect in-line pressure drops between the pump and the reaction chamber within each pressurized source maternal stream. As best seen in FIG. 4, two pressure transducers are used to monitor the pressure of each source material pressure, the first, 172, 172', before and the second, 174, 174', after the fixed restriction 176, 176' provide separate closed, in-line, flow-thru flowmeters 106, 106' for each source material. More specifically, pressure transducer 172, 172' senses the inlet pressure of the source material prior to passing through the fixed restriction 176, 176' and the second pressure transducer 174, 174' senses the outlet pressure therefrom.

The source materials exit the flow meters and continue through a priming valve 178, 178'. The priming valve in each source material stream is opened to allow relatively unimpeded flow while the system is initially filled with the source materials. Each source material continues through a shut-off valve 180, 180)', (useful for system maintenance and for calibration of flowmeter pressure transducers 172, 172' and 174, 174') and through check valve 182, 182' before entering the reaction chamber 120. The check valves 182, 182' prevent flow of each source material from traveling into an opposing leg. This is particularly helpful during start-up prior to the accumulators 170, 170' (if used) being fully charged over several piston cycles, i.e. when the pressures and flows have not reached steady-state conditions and are not fully matched. The check valves 182, 182' also help prevent uncontrolled mixing of source materials outside of the mixing reaction chamber.

The critical element of controlling the flows of two or more low viscosity liquid streams at very high pressure in the present invention is accomplished in this embodiment based upon the general relationship:

$$Q=k(P_1-P_2)^{1/2}$$

wherein Q is the flow through a specific restriction, $P_1$ is the inlet pressure at pressure transducers 172, 172' into the flowmeter restriction, $P_2$ is the outlet pressure at pressure transducers 174, 174' after the flowmeter restriction, and k is a constant proportional to the length and inversely proportional to the cross sectional area of the restriction. The higher the driving potential energy and the greater the drop in potential energy across the flowmeter, the better the flow regulation.

Use of the restriction portion of the flow meter and its resultant pressure drop enhances stream flow regulation. In fact, the smaller a restriction and the greater the resultant pressure drop across it, the better the flow insensitivity to downstream changes and the better the flow regulation. This flow regulation enhancement is completely independent of the flow monitoring (measurement) produced by the same restriction.

Figure 7:
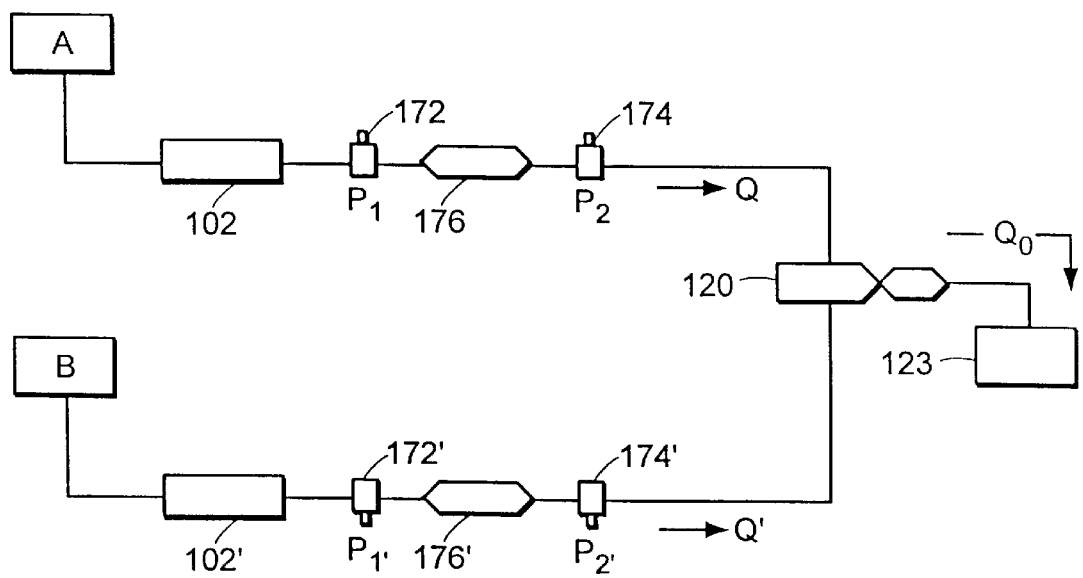
FIG. 7 is a schematic diagram of a general dual stream high pressure chemical mixer/reactor used to explain the control system.

Referring to the simplified dual stream system of FIG. 7 (in which like elements as in FIG. 4 have like numbers) as an example, the total liquid flow out of the system ($Q_o$) is the sum of the flows of each stream, i.e. Q plus Q'. Thus the total output flow of the dual stream model can be expressed by Eq. 1:

$$Q_o=Q+Q' \qquad 1.$$

Then, substituting into the general formula:

$$Q_o=k(P_1-P_2)^{1/2}+k'(P_{1'}-P_{2'})^{1/2} \qquad 2.$$

In steady state operation, $P_2=P_{2'}$. Examining the variation in flow output $\Delta Q_o$ with respect to changes in pressure out, $\Delta P_{2'}$ yields:

$$\Delta Q_o/\Delta P_2=-(1/2)(k)/(P_1-P_2)^{1/2}-(1/2)(k')/(P_{1'}-P_{2'})^{1/2} \qquad 3.$$

With the simplifying assumptions that k=k' a constant and $P_1=P_{1'}$, then Eq. 3 can be expressed as:

$$\Delta Q_o / \Delta P_2 = -k/(P_1-P_2)^{1/2} \qquad 4.$$

If the output flow is normalized to a predetermined value $Q_{set}$ ($Q_s$), and recognizing that k is a constant, the resulting nominal input pressure is ($P_{1s}$) and the output pressure is ($P_{2s}$). Then:

$$Q_s = k(P_{1s}-P_{2s})^{1/2} \qquad 5.$$

and $$k = Q_s/(P_{1s}-P_{2s})^{1/2} \qquad 6.$$

Then, substituting k from Eq. 6 into Eq. 4:

$$\Delta Q_o / \Delta P_2 = -[(Q_s)/(P_{1s}-P_{2s})^{1/2}]/(P_1-P_2)^{1/2} \qquad 7.$$

Accordingly, the degree of flow regulation with respect to the pressure out of the flow meter is directly dependent on the nominal flow level and inversely dependent on the square root of the pressure drop across the flow meter. Thus, the smaller the change in flow divided by the change in exit pressure ($\Delta Q/\Delta P_2$) is, the less dependent total flow $Q_o$ is on $P_2$. $P_2$ is zero only in the trivial case, i.e. when there is no processing pressure $P_2=0$. $P_2$ must be non-zero.

If the pressure differential ($P_1-P_2$) is very mush greater than $Q_s$, then the output flow $Q_o$ will have less dependence on $P_2$. Also if $P_1$ is very much greater than $P_2$ then again the output flow $Q_o$ will have less dependence on $P_2$.

Using design operating parameters of output flow $Q_o$ being 0.5 liters/minute (1/m), $P_2$ as 10,000 psi, and $P_1$ as 15,000 psi, Eq. 7 becomes $\Delta Q_o/\Delta P_2 = -(0.5)/(15,000-10,000) = -0.0001$. Thus, with all other parameters held constant, for every 1,000 psi increase in $P_2$ there is a 0.1 l/m decrease in $Q_o$. This amounts to $-(0.1/0.5) \times 100\% = -20\%$ or a 20% change in flow for every 1,000 psi change in $P_2$.

On the other hand, if the input pressure to the flowmeter $P_1$ is 40,000 psi and the other parameters are the same as above, then $\Delta Q_o/\Delta P_2 = -(0.5)/(40,000-10,000) = -0.0000167$ and for every 1,000 psi increase in $P_2$ there is a 0.0167 l/m decrease in $Q_o$. Thus flow regulation sensitivity with respect to $P_2$ is improved by a factor of six times by increasing $P_1$ while keeping $Q_o$ constant. In this case, there will be a $-3.33\%$ change in flow for every 1,000 psi change in $P_2$.

As shown, a six-fold increase in the in-line pressure drop (from 5,000 to 30,000 psi) results in a six-fold improvement in flow regulation, everything else being held constant. Better flow regulation is accomplished by having a higher potential energy driving force and more loss of pressure in the regulation process as represented by the higher energy loss across each stream restriction. The more energy used in flow regulation, i.e. "thrown away" by the restriction, the better the flow regulation obtainable. Since the current practical upper limit of pressure handling with relatively common tubing and couplers is about 50,000 psi and the best mixing is obtained at the highest mixer/reactor velocities derived from the highest obtainable pressures, the magnitude of pressure drop to be used for regulation is a compromise among the desired mixing intensity, the required nominal flow magnitude, the desired degree of flow regulation, and the economics of creating higher pressures at a given nominal flow.

Based upon the above principles, in-line pressure drops of about 5 to about 60% have generally been found to provide the requisite degree of flow control, although pressure drops of 90% or more could be used when exceptional flow control is required. Preferably a pressure drop of about 10 to 50% is used. Most preferably the pressure drop is about 20 to 40%.

In the above dual stream flow control analysis, all flow regulation was attributed to changes in $P_2$ and all flow variations are represented by changes in $Q_o$. In fact, however, changes in $P_2$ can be caused by changes in k or any other flow controlling parameter, e.g. partial clogging of the mixer/reactor chamber or by an increase in the flow of one or more of the multiple streams, and changes in Q can be made by any combination of changes in Q or Q'. Although it has generally not been found necessary, more accurate and complicated multiple stream flow control based upon the above principles can be used to better describe details of the actual individual stream flows. For example, the simplifying assumptions that k=k'=a constant, and $P_1=P_1$, in Eq. 3 can be reversed to accommodate systems in which the stream flows are not being maintained at equivalent pressures. In this case:

$$\Delta Q_o/\Delta P_2 = -(k/2)/(P_1-P_2)^{1/2} - (k'/2)/(P_{1'}-P_2)^{1/2} \qquad 8.$$

applies and using $Q_s = k(P_{1s}-P_{2s})^{1/2}$, then $k = Q_s/(P_{1s}-P_{2s})^{1/2}$, $(P_{1s}-P_{2s})^{1/2} = B$, and $(P_{1's}-P_{2s})^{1/2} = B'$, then Eq. 9. results:

$$\Delta Q_o/\Delta P_2 = -Q_s/2B(P_1-P_2)^{1/2} - Q_s/2B'(P_{1'}-P_2)^{1/2} \qquad 9.$$

Sensitivities of individual stream flows to specific flow controlling parameters in a multiple stream system can be examined by first expressing the total flow $Q_o$ as the sum of the input flows of the individual streams:

$$Q_o = Q_1 + Q_2 + Q_3 + \ldots + Q_n \qquad 10.$$

and then taking the partial derivative of the flow equation with respect to the specific flow controlling parameter. By choosing the flow controlling parameter, $k_o$ for the system, and a flow $Q_1$:

$$\Delta Q_o/\Delta k_o = \Delta Q_1/\Delta k_o + \Delta Q_2/\Delta k_o + \Delta Q_3/\Delta k_o + \ldots + \Delta Q_n/\Delta k_o \qquad 11.$$

and $$\Delta Q_1/\Delta k_o = \Delta Q_o/\Delta k_o - \Delta Q_2/\Delta k_o - \Delta Q_3/\Delta k_o - \ldots - \Delta Q_n/\Delta k_o \qquad 12.$$

The magnitude of output $Q_o$ and the resultant $k_o$ depend entirely on the scale of the desired operation and $Q_o$ may range from about 10 ml/min for a laboratory mixer/reactor to 100 l/min for production processing. The desired $k_o$ values will follow the desired scale and the trade-offs cited in determining the degree of flow regulation.

Flow control of each source material is provided by a closed loop feedback control system, preferably one utilizing proportional-integral-derivative (PID) error signal processing. Feedback control techniques are based upon a comparison of an actual output to a desired response (usually referred to as the input) to generate an error signal and then correction of the output based upon the generated error signal. PID error processing allows independent adjustment of the offset, average, and tracking errors to provide better flow control. PID processing of the error signal addresses each of these errors.

More specifically, PID processing controls the flow of source materials to the mixer/reactor by controlling a process variable signal which is representative of the process to be controlled and a setpoint signal representative of a desired value for the process variable, by (i) producing a difference signal of a difference between the process variable signal and the set point signal; (ii) applying an adjustable gain to the difference signal to thereby produce an amplified signal; (iii) integrating the difference signal to produce an integral signal; (iv) differentiating the difference signal over time to produce a differential signal; (v) combining the amplified signal, the integral signal, and the differential signal, in a weighted sum to form a process signal which is applied to the process to control the process. Thus, the control loop error signal is processed separately and in parallel by three functions.

The following is a simple quantifiable example of how, at first pass, the PID parameters may be set. If the desired output error is to be less than 1% (one part in a hundred), a loop gain of 100 or greater is required. If by loop open test a system requires 1 second to respond, the cumulation or summation of from about 2 to and less than about 10 seconds of error is desirable to smooth response. If overshoot is undesirable, a heavier weighting to the rate of change of error is required. Suitable control of the present mixer/reactor with two similar density liquid streams has been obtained using an overall gain of about 120, a cumulation of 3 seconds of error, and P-I-D weightings of about 1.0-0.4-0.3 has been found to provide an appropriate first pass parameter set. The actual PID weightings may be determined from open loop system response to a known input such as a "step input" or an impulse or delta function input. A step input is preferable.

For data input and control output, suitable input/output hardware is required which includes multiple inputs (at least 2 per source material stream), a multiple input analog to digital (A/D) converter, multiple digital inputs, and multiple digital-to-analog (D/A) outputs. A PC-bus compatible standard input/output interface card such as the CyberResearch CDAS 8 AO meets these requirements. It has a ±5 volt input range and a 20 kHz max conversion rate which provides 50 $\mu$sec minimum sampling rate and was used in the examples below. For each source material stream, two inputs are required, one each for the respective fill and process limit switches on the pump. Thus four inputs are required for a dual stream system. The CYDAS 8 AO outputs are used to form the signals which drive and vary the pistons controlling proportional directional hydraulic control valves 144 and 144' of FIG. 4.

For convenience, standard LabTech Notebook Pro for Windows (LTNBK) building blocks may be used in which each LTNBK block is uniquely configured as an input, output, or calibration block. Configuration is accomplished for each block by defining function, scaling parameters, name, block number, etc. within a block's configuration file. The results of one block may be defined as an input to a following block. A calculation block operates mathematically on its input and delivers the result to the following block.

LTNBK visually represents the blocks as square icons on a computer video screen. Blocks are connected by picking up a block's output, an extendable arrow, and dropping it as an input to the target block. A block's operator or function is symbolically displayed within the block's icon square. Detailed block configurations are not shown on the set-up screen but may be displayed and changed by opening a block's configuration file.

An assemblage of interconnected blocks which represent a series of executable software instructions is called a "set-up." Set-ups can be modified, stored, and retrieved as software files. Set-ups may input data through an interface card such as the CYDAS 8 AO, process the data such as to create a desired result, and output the result through the same or a different interface card. Sampling rates, set-up run times, and input or output voltage ranges may be defined.

Figure 6:
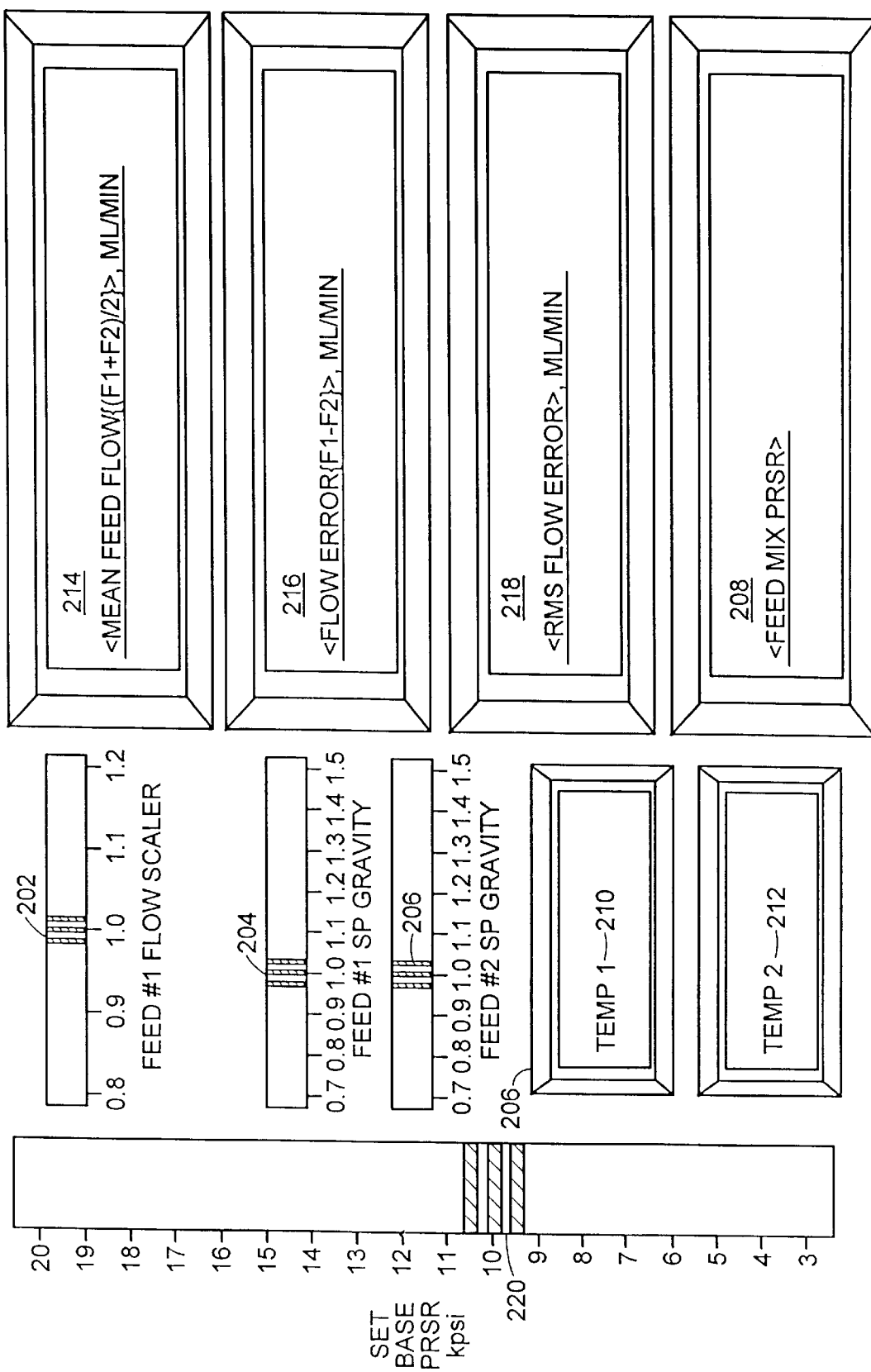
FIG. 6 is a vision screen useful with the control system of FIG. 5.

Information based on input data may be displayed with a "vision" screen, an example of which is provided in FIG. 6, which typically takes on the appearance of an instrument panel with numerical or meter displays, chart recorder or oscilloscope simulation, and control knobs and switches. Set-ups can be "RUN" which means that input data is sampled and results passed to subsequent operational blocks or to the vision screen. The run state is called "run-time."

Figure 5:
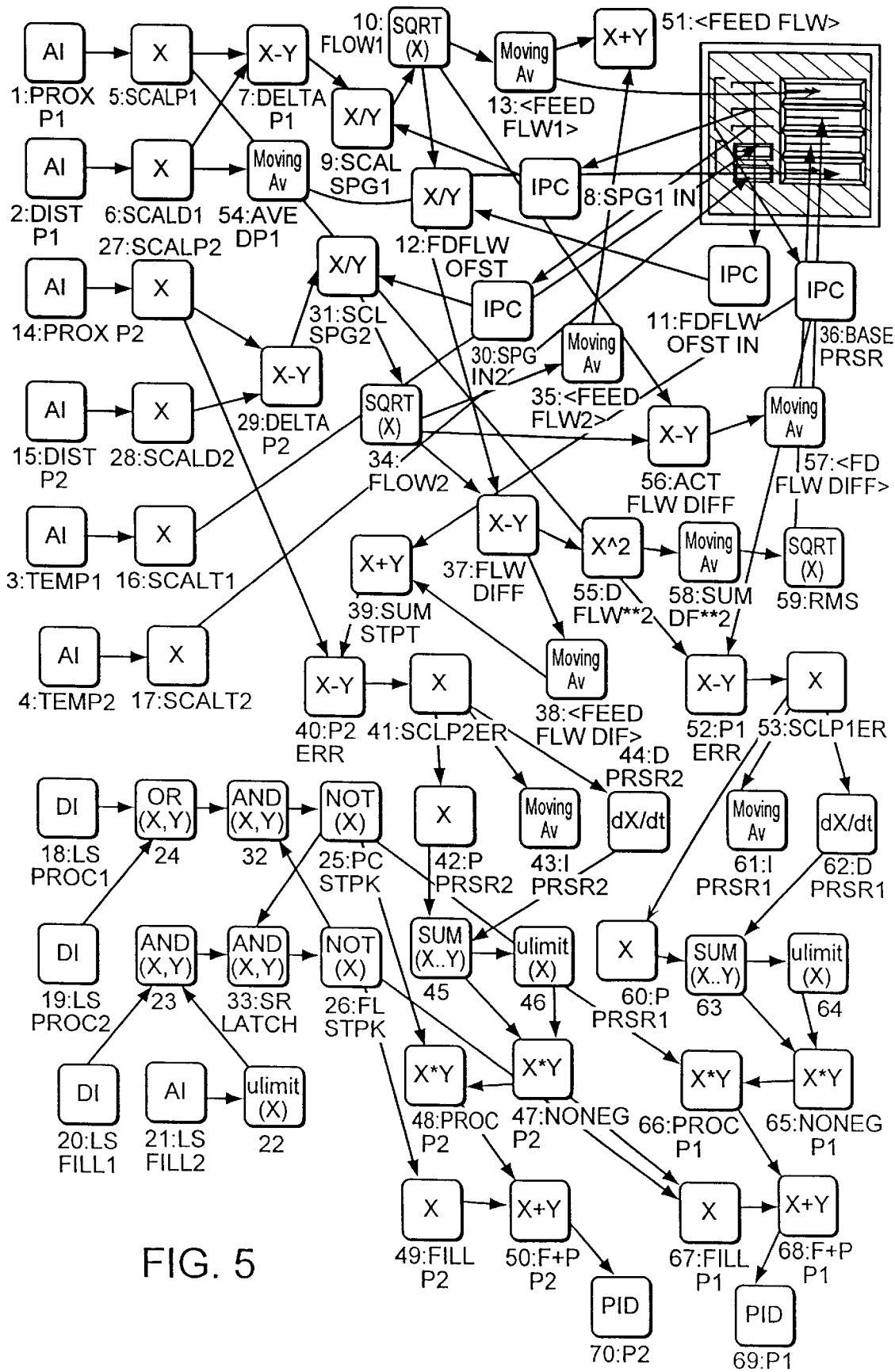
FIG. 5 is a schematic drawing of a control system for a dual stream mixer/reactor of the invention.

FIG. 5 shows a control set-up, i.e. the software algorithm, created to realize a closed loop proportional-integral-derivative (PID) error signal processing control of the dual stream system of FIG. 4. All blocks are numbered in FIG. 5 and sampling follows the sequential numbers, i.e. block 1 is sampled first, block 2 second, etc. Block 1 is an analog input (AI) configured to access CYDAS 8 AO Input 0. The voltage output of pressure transducer 172 is connected to Input 0 and the proximal pressure transducer 174 data of source material A is routed thru block 1 to its following block 5. Data from the input (proximal) 172, 172' and output: (distal) 174, 174' pressure transducers which, with fixed restrictions 176 and 176' respectively, comprise source material A and source material B flow meters, are routed in through analog input blocks 1, 2, 14, and 15. Offsets present in the pressure transducers 172, 172', 174 and 174' are subtracted out in the AI blocks. Calibrated scaling of each of the pressure transducers is accomplished in the following "X" blocks, i.e. 5, 6, 27 and 28.

Source material A flow is calculated by multiplying the square root of the pressure drop across the fixed restriction 176 times the fixed restriction constant k. This is accomplished with the operation of blocks 1, 2, 5, 6, 7, 9 and 10. Source material B flow is calculated in like manner with operations of blocks 14, 15, 27, 28, 29, 31 and 34. Flow calibration is achieved by driving each stream independently with a modified set-up, cumulating a timed and measured liquid volume, and then adjusting the set-up flow scale factor. In the modified set-up, the reaction chamber is i removed and "dummy" equivalent chambers are placed on the end of each stream. The system is then run and the output from each stream is collected in a graduated flask over a short time period, e.g. 30 to 60 seconds. This flow rate in liters per minute is compared to the flow being sensed by the pressure drop flow meters and an algorithm multiplier constant in blocks 10 and 34 is corrected such that the system sensed flow is properly calibrated.

Input blocks 18, 19, 20 and 21 are connected tc limit switches 152, 152', 154 and 154'. Blocks 18 and 19 input the states of limit switches 152 and 152'. These inputs are "low tri-e" and are OR'd together at block 24 which produces a low result only when both inputs are low. A block 24 low true "sets" the output of a flip-flop latch configured with blocks 32, 33, 25 and 26. The resulting latched "Process" signal occurs only when both hydraulic pistons 150 and 150' have returned to their fully filled positions. This synchronizes the start of the active source materials pressure strokes.

Blocks 20 and 21 (FILL1 and FILL2) input the states of limit switches 154 and 154'. These inputs are low true and are AND'd together at block 23 which produces a low result when either or both inputs are low. A block 23 low true "resets" the output of a flip-flop latch configured with blocks 32, 33, 25 and 26. The resulting "Fill" signal occurs when the first of either hydraulic piston 150 or piston 150' (or both) reaches the end of a process stroke.

In the dual stream implementation, first the input pressure of source material A is controlled by taking the difference between the "slider" 220 selected base pressure on the run-time vision screen of FIG. 6 interfaced through IPC block 36, and the actual pressure from block 5. This difference produces a pressure error signal with block 52. Blocks 53, 60, 61, 62 and 63 comprise the signal processing for the pressure error signal. Blocks 64 and 65 insure the result is non-negative. Block 64 compares the input from Block 63 to 0. If the result is positive, block 64 generates an output of "1." If the result is negative, block 64 generates an output of "0." Block 65 multiplies the output of block 63 and the result of block 64 and delivers that output to block 66.

A moving flow average flow difference between source material A and source material B is produced with blocks 37 and 38. In the dual stream implementation, this difference or error is then added to the base pressure in block 39 to create a second pressure setting. Source material B is then controlled to this modified pressure (set pressure plus flow difference) via signal processing just as for source material A. Block 40 creates the source material B input pressure error from blocks 27 and 39. The signal filtering is contained in blocks 41, 42, 43, 44, and 45. Blocks 46 and 47 insure the result is non-negative.

Whether the source material A and source material B outputs utilize the closed loop control signals from blocks 47 and 65 respectively or are hard-driven to fill the source material pistons quickly is mediated by the flip-flop latch outputs of blocks 25 and 26. The latch outputs either enable blocks 48 and 66 for closed loop control of the process strokes or blocks 49 and 67 to drive the fill strokes.

FIG. 6 shows a suitable computer display presented when the control algorithm of FIG. 5 is run for a two source material system. The display includes a slider 202 labeled "FEED #1 FLOW SCALER" with a mouse controlled screen cursor (not shown). Moving the slider 202 changes the slider-presented coefficient (from 0.8 to 1.2 shown) in the algorithm, therefore changing the flow of source material #1 accordingly. Wider stream flow differences are settable with this approach by changing the algorithm. However, to maintain individual source material flow set levels and obtain the required flow regulation, additional isolation by increasing the in-line pressure drop may be advantageous. For example, for a dual stream mixer/reactor in which the two source material flows need to differ by a factor of less than 2 to 1, control can be accomplished with an in-line pressure drop of about 50% or less. Alternatively, multiple feeds of one of the source materials to the reaction chamber may be used. When flow differences of about 2 to 1 or more are needed for a particular reaction, multiple feeds are recommended.

Since the source material density or specific gravity will effect the pressure drop flow meter calibration, the display includes additional on-screen adjustment sliders 204 and 206 labeled "FEED #1 SP GRAVITY" and "FEED #2 SP GRAVITY" respectively to allow for adjustment of source material densities.

Displays 210 and 212 show the respective temperatures of the two source materials. The temperature displays represent the input from two platinum positive resistance temperature devices (PRTD) which are placed on the input and output lines. Temperature sensing may be important when a source material varies substantially in density or viscosity with temperature, or for exothermic reactions or to insure a minimum temperature for endothermic reactions.

The display may also provide other information to the operator, for example flow error numerical displays are presented. A display 208 labeled "FEED MIX PRESSURE" indicates the pressure at the reaction chamber entry. Other possible displays include the "MEAN FEED FLOW {(F1+F2)/2}" 214, "FLOW ERROR {F1−F2}" 216, and "RMS FLOW ERROR" 218. The flow error displays may be useful to confirm that the system is controlling the ratios of source materials to an acceptable degree. Excessive flow error will result in an excess of one source material which will lead to an incomplete reaction. If an operator observes an excessive flow error, he can adjust the stream flow ratios or the feed specific gravity or simply shut down the process to make the correction.

A second preferred dual stream embodiment of the present invention (not shown), substantially identical to that of FIG. 4, obtains flow measurement and control by an indirect technique, i.e. by measuring or calculating hydraulic flow and converting that hydraulic flow to source material stream flow using the intensifier relationship or ratio. This is accomplished by replacing limit switches 152, 152' and 154, 154' at either end of the hydraulic pistons 150, 150' with a piston position indicating means (not shown) and adding a hydraulic flow pressure transducer (not shown) to each pipe 142, 142'. This allows the elimination of pressure transducers 172, 172' and 174, 174'.

In this embodiment, flow measurement and control are no longer dependent upon fluid density. Also, error between the calculated flow and the actual flow could occur from a change in the effective area of the fixed restrictions 176, 176', either by wear causing an increase in area or by a partial obstruction causing a reduction in area. This embodiment avoids that possibility.

Use of piston position indicators allows the monitoring of the hydraulic piston position. With the measured position, a known piston area, and a stable, accurate time base, source material flow—fluid volume per unit time—is readily calculated. Verification and calibration are used to assert the error of the calculated flow is minimized and known with respect to the actual flow.

Any reliable position indicator technology which has a resolution and stability of better than about one part in a hundred is acceptable for use herein. Suitable devices include optical pick-ups, capacitive sensors, variable resistance potentiometers, and transmission-delay-reflection equipment. Time bases with accuracies and stabilities of about one part per ten thousand are available. This allows stream flow measurement and control to better than about 1%.

The position indicator means of choice is a magneto-restrictive based, linear position transducer wherein the distance or measurement is based on a rod of magneto-restrictive material which is pulse stimulated at one end using an acoustic transducer. The acoustic pulse velocity in the rod is known and stable. A captured sliding magnet with fixed physical attachment to the hydraulic piston couples a magnetic field into the magneto-restrictive rod. The magnetic field pinches off the magneto-restrictive material such that the acoustic pulse reflects back along the rod and is picked up by the transducer. The time delay between the transmitted and reflected pulse represents the distance of the magnet along the rod and also the position of the hydraulic piston. Resolution and accuracies of 0.001 inch (.00254 cm) in rod lengths of 2 to 30 inches (5.08 to 76.2 cm) are available.

The linear position transducer can be mounted as an add-on to existing hydraulic pistons or mounted as an integral part of the piston shaft. The magnet and rod attachments are nearly massless and frictionless to the piston; the components are rugged, reliable, and stable; the components can be easily integrated into the hydraulic piston; the only fluid density variations are due to minimum changes in the temperature of the hydraulic fluid/oil from room temperature to about 70° C. operating temperature; the components are isolated from the hydraulic fluid and the source material stream; and the initial coefficient values are readily calculated from the physical dimensions of the hydraulic piston and the intensifier.

The relationship of source stream flow to hydraulic piston position can be determined by the equation:

$$Q = A/I \, dL/dt$$

wherein, Q is flow in milliliters per minute (ml/min); A is the hydraulic piston cross sectional area in square centimeters; I is the intensifier ratio; L is the piston position in centimeters; t is the time in minutes; and dL/dt is the change in piston position with respect to unit time.

Figure 8:
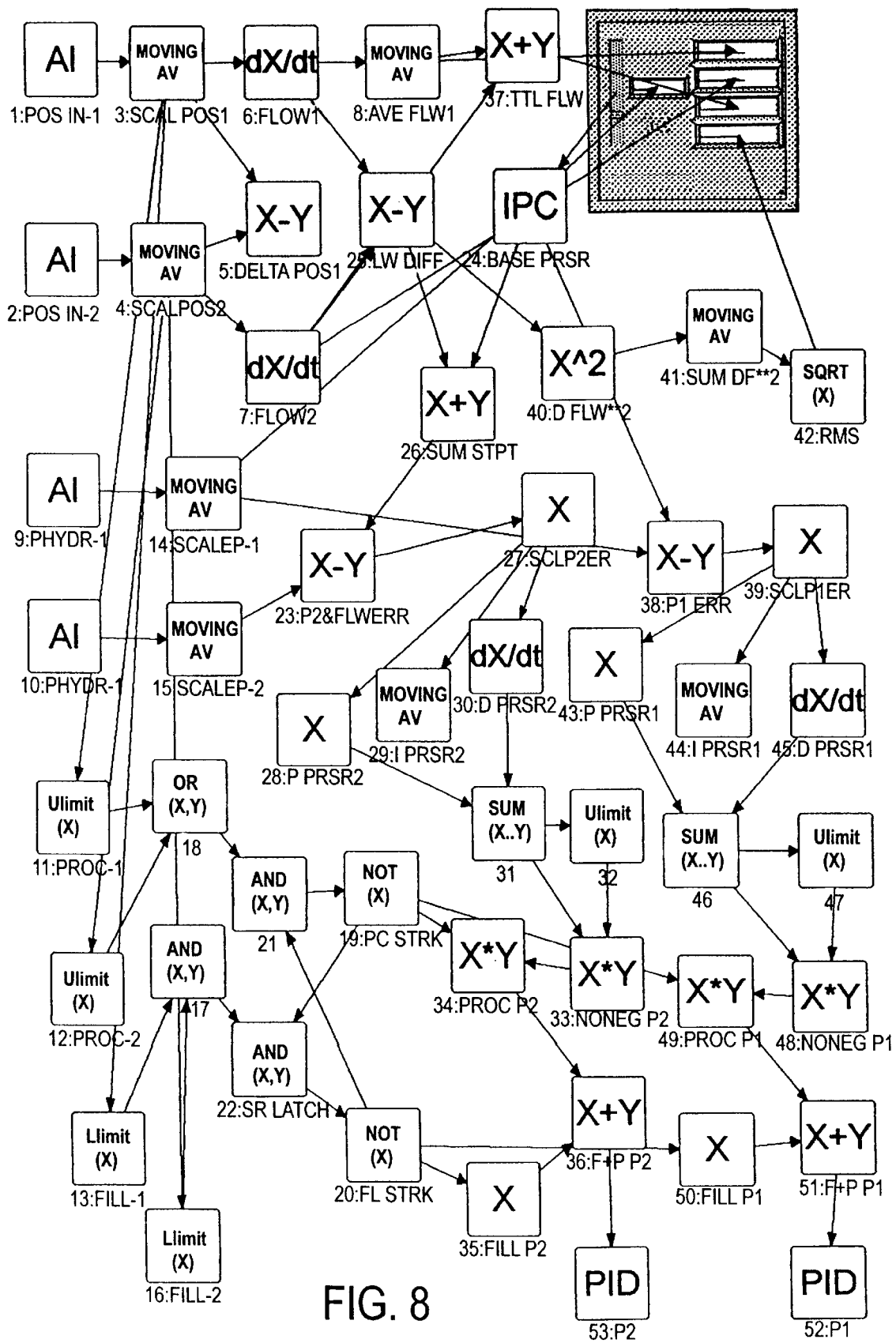
FIG. 8 is a schematic drawing of an alternative control system for a dual stream mixer/reactor of the invention.

FIG. 8 shows a control set-up, software algorithm of this alternative control system for a dual stream mixer/reactor of the invention using a closed loop proportional-integral-derivative (PID) error signal processing control. As in FIG. 5 above, all blocks are numbered in FIG. 8 and sampling follows the sequential numbers, i.e. block 1 is sampled first, block 2 second, etc. Block 1 is an analog input (AI) configured to access CYDAS 8 AO Input 0. Hydraulic piston position 1 is acquired thru the computer analog-to-digital input represented by Block 1, POS IN-1. This signal is then scaled and two successive points averaged in Block 3. Block 6 is the flow scaled time derivative of position and the output of Block 6 is flow in ml/min. Correspondingly for the second source material stream, Blocks 2, 4, and 7 perform the same functions as Blocks 1, 3, and 6, and the Block 7 output is the calculated from from the second hydraulic piston.

The hydraulic pressure driving each of the hydraulic pistons is measured with strain gauge transducers whose analog-to-digital inputs are represented by Blocks 9 and 10 for piston 1 and piston 2, respectively. Hydraulic pressure 1 and the resulting stream flow 1 is controlled by comparison of the base pressure set by the software slider thru Block 24 and the scaled hydraulic pressure from Block 14. The flow 1 and flow 2 difference is added to the Base Pressure–Hydraulic Pressure 2 comparison to control stream 2 to match stream flow 1. End of travel of the hydraulic pistons is set by limit Blocks 11, 12, 13, and 16.

The remainder of the algorithm, the PID error filtering, is the same as in the set-up shown in FIG. 5. Adjustment of the PID parameters is accomplished in the same manner as with any control system.

The software set-up in FIG. 8 is simplified feom the set-upo in FIG. 5. Specifically, the source stream density or specfic gravity inputs are no longer needed. The feedflow offset adjustments and the temperature inputs have been removed, but may be included if desired.

While the continuous flow feature of all of the liquid streams in the present invention is important, substantially similar results may be obtained in a pulse flow system if the pulses are of appropriate size that control of the pressure and flow of each source material results in a one-to-one matching of the flows from each source material. This could be accomplished by removing the accumulators (flow dampeners) and then matching the resulting pulses by simultaneous control of both pressure and flow.

While the flow restriction 176, 176' is shown as a separate element in FIG. 4 from the reaction chamber 120, there may be benefits from combining the elements into a single unit.

The reaction chamber may be constructed in any desired manner depending upon the desired shape and size for a particular application. For example, the procedures disclosed in U.S. Pat. Nos. 4,533,254 and 4,908,154, the subject matters of which are incorporated herein by reference, may be used. In these reaction chambers two block-forming members are first ground and lapped to be optically flat and then grooves corresponding to a desired macromixing, mesomixing, and micromixing zones sizes and shapes, are etched into the face of each block in a precisely aligned manner. The size of the macromixing and mesomixing zones may also be varied by the use of one or more shim spacers between the two block-forming members. Alternatively, the reaction chamber may be formed as disclosed in U.S. Pat. No. 5,380,089, the subject matter of which is incorporated herein by reference, including that of U.S. patent application Ser. No. 919,859 disclosed in the Background of the Invention thereof. Suitable materials for making the chamber include stainless steel, hard carbon steel, tool steel, ceramics like tungsten carbide or sapphire, ceramic composites, diamond, and the like.

The multiple stream high pressure continuous mixer/reactor of the present invention is particularly useful for reactions which entail the precipitation of an insoluble or sparingly soluble material C from two (or more) liquid source materials, preferably ionic solutions, A and B, involving an irreversible chemical reaction of the type:

$$A + B \rightarrow C\downarrow$$ 

and subsequent crystallization, i.e. nucleation and growth of crystals, of the reaction product C.

The continuous flow chemical mixer/reactor allows control of the complete turbulent mixing phase when two miscible fluids that are initially separate are caused to interact in turbulent flow to eventually become homogeneous. The mixing which occurs can be described by the mechanisms of macromixing, mesomixinq, and micromixing, which occur predominantly in series but to some degree in parallel.

The mixer/reactor is useful in preparing chemical compounds from continuously flowing source materials and has substantial advantages over conventional batch vessel reactors in speed, efficient use of source materials, and minimization of process operations. Moreover, the process provides an ability to directly produce a more uniform smaller particle size product than by conventional manufacturing processes and without requiring any separate particle size reduction, grinding, milling, or the like procedures.

The mixer/reactor can be used to perform endothermic, exothermic and equilibrium controlled reactions between two or more liquids. More specifically, suitable reactions include acid/base reactions, condensation reactions, decomposition reactions, displacement or extrusion reactions, substitution or replacement reactions, disproportionation reactions, elimination reactions, enhancement of surfactant activity, oxidation-reduction reactions, precipitation reactions, phase transition reactions (as in crystal structure), phase transition and phase transfer reactions (with and without catalysts), polymerization reactions, tribolitic reactions, and the like.

The mixer/reactor can be used for any liquid phase reaction. It is also useful for metering multiple feed streams for purposes of obtaining uniform mixtures thereof wherein no chemical reaction occurs, i.e. to enhance the formation of more uniform dispersions, encapsulations, extractions, and the like. It may also be used to produce emulsions having small dispersed phase particles.

Preferably, the mixer/reactor is used for the precipitation of solid materials as a result of chemical reaction between two or more liquid material streams, thus leading to one or more of: a more uniform chemical composition, a narrower distribution of crystallite and/or particle sizes, the production of previously unobserved phases and crystallite morphologies. Thus, the mixer/reactor is useful to prepare improved versions of the nanosize particles of U.S. Pat. Nos. 5,417,956 and 5,466,646. In addition, the mixer/reactor may be used as a fast chemical reactor in which the desired product is favored by the fastest possible mixing, whereas undesired products tend to predominate where the intensity of mixing is lower. A still further use is for reactions requiring the mixing of two dissimilar liquid phases which may be only sparingly or totally immiscible to produce a reaction product. A still further use is as a chemical nucleator in which the high degree of supersaturation that can be provided by the mixer/reactor results in increased nucleation rates compared to conventional mixing devices wherein lower degrees of supersaturation are achieved. The net result is a product comprising smaller crystallite sizes compared to conventional mixing devices.

The products produced may be useful in directly or indirectly as materials suitable for use as biomaterials, biormimetic materials, catalysts, catalyst support materials, coatings, composites, electronic materials, foods and food additives, ceramics, inks and dyes, liposomes, metal oxides and hydroxides, optical compounds, paints, pharmaceuticals, semiconductors, superconductors, zeolites, and the like.

The products may be in a liquid or solid state and may be in the form of, for example, clusters, colloids, inorganic networks, intercalcation compounds, layered materials, metals and metal compounds, magnetic materials, molecular crystals, monolayers, nanophase materials, organic networks, thin films, and the like.

Synthesis of catalysts or catalytic precursor, is frequently carried out by the mixing of two or more solutions containing species which react to form a precipitate. Most frequently, this is accomplished using aqueous solutions. Many single component, as well as multicomponent precipitates, in the form of hydroxides, hydrous oxides, hydroxycarbonates, etc., are prepared in this manner.

In many cases, maintenance of a specific solution pH is important in determining the composition or phase of the precipitating product. Small local variations in pH within the solution due to reactions occurring before mixing is complete can result in an inhomogeneous product being formed, which can result in a product with less than optimal properties, and as a result, delivering less than optimal performance. Similarly, when the precipitation involves the mixing of several components, local concentration gradients in the solution can again affect the properties and phase composition in the final product. One of the aspects of the present invention is to provide a method of introducing and mixing solutions with extremely high intensity, such that mixing is complete prior to any precipitation reactions, such that local inhomogeneities of pH or concentration are minimized, leading to materials that are more homogeneous and phase pure or that have different, previously unobserved, phase compositions.

In addition to the homogeneity of the precipitated product, another property of the product which can be important is the crystallite size. Smaller crystallite sizes lead to materials which have a higher surface area, which is important for many applications in catalysis and adsorption. The crystallite size of the product can be controlled in part by the mixing parameters employed during the precipitation. For a given mass of reacting species, the crystallite size is determined by the number of nuclei that are formed upon mixing, which then undergo crystal growth to the final product. In some cases, the nucleation is controlled by the amount of impurities in solution, and is driven by so-called heterogeneous nucleation. However, in other cases the process is driven by homogeneous nucleation, which occurs when the local concentration exceeds supersaturation. As the quality of the mixing of the solutions improves, the degree of supersaturation of the solutions throughout the reactor vessel can be increased. As a result, a larger quantity of nuclei can be formed, resulting in a greater quantity of crystallites being produced for the same overall weight of product. A second aspect of this invention is therefore to provide a means to produce a precipitated product having a small crystallite size, based on the application of intense mixing during precipitation.

In the following non-limiting examples, all parts and percents are by weight unless otherwise specified. The following examples and comparative examples demonstrate that the dual stream high pressure reactor produces smaller crystallites and a narrower distribution of crystallite sizes as compared to product produced by a conventional precipitation. The specific example is the precipitation of calcium carbonate.

EXAMPLE 1

Precipitation of Calcium Carbonate Using the Dual Stream Reactor of the Invention For this experiment, 0.4 M solutions of calcium nitrate and sodium carbonate were prepared. When mixed in equal volumes, the reactants produced a 2 wt % slurry of calcium carbonate. The calcium nitrate solution was added to the reservoir of the first pump, and the sodium carbonate solution was added to the reservoir of the second pump. The pump pressures were adjusted to 20 kpsi, the pumps were turned on, and samples were collected from the exit port of the reaction chamber after the system had stabilized. The pressure drop across the reaction chamber was 15.5 kpsi and the total flow rate was 580 ml/min. The product was a creamy gel which had modest flow under its own weight. Upon sitting, the gel structure collapsed and solids settled to the bottom of the collection vessel.

Analysis of the crystalline product by light microscopy indicated cubic shape crystals which were rounded at the corners to assume a near spheroidal shape. The observed average crystallite size was approximately 1 micron. There was a narrow size distribution in which the difference between smallest and largest crystallites in linear dimension was no greater than a factor of two.

COMPARATIVE EXAMPLE A

Precipitation of Calcium Carbonate via Conventional Device

Solutions of calcium nitrate and sodium carbonate as described above for Example 3 were prepared. These solutions were added simultaneously by use of a metering pump to a Waring® blender to which had been previously added sufficient water to provide a 1% slurry concentration upon completion of the reagent addition. A Waring® blender is a laboratory scale mixing devise designed to provide intense mixing. The introduction of the reactants proceeded under continuous stirring of the blender. The mixed solutions initially formed a gel which broke up upon additional agitation.

The calcium carbonate product was evaluated by light microscopy and showed crystals having average size 7 microns and a spread between the largest and smallest crystallites of approximately a factor of 10.

The next two examples demonstrate the ability of the dual stream high pressure reactor to produce a product of more uniform composition as compared to a product produced by conventional precipitation. Example 2 is the preparation of aluminosilicate gels from soluble aluminum and silicon precursor solutions. Example 3 is the preparation of aluminosilicate gels, that are precursors to mullite oxide materials, from colloidal alumina and silica sources. Uniformity in composition is related to the degree of intimate mixing of the Si and Al building block species in the dry gel. It can be measured directly by elemental mapping of solid particles of the material, in which case an absolute measure of the uniformity of composition is obtained. However, this technique is limited to the measure of relatively large differences in composition because of its resolution. Other indirect techniques that can be used give a relative, average measure of uniformity of composition. One such technique is Nuclear Magnetic Resonance (NMR) that was used in Example 2 and can probe the average local atomic environment of an element in a solid. Another technique for multi-component oxide materials is to monitor the temperature of transition to a pure, thermodynamically-favored mixed phase. This technique was used in Example 3.

Aluminosilicate gels find application upon drying as catalyst supports and/or active catalyst phases. They can also be used as precursors for the synthesis of crystalline aluminosilicate zeolites. A gel is defined as a solid matrix that encapsulates a solvent. Thus, gels typically do not flow under their own weight because of their high viscosity.

Aluminosilicate gels can be prepared via the reaction of a basic Si source, for example sodium silicate, with an acidic aluminum source, such as aluminum sulfate. The distribution of aluminum and silicon within the gel is an important property which can determine catalytic properties such as the acidity of the material. An effective method to determine the distribution of Si and Al is by $^{29}$Si NMR of the solid material. The position of the Si resonance (ppm) is dictated by the coordination around this silicon, i.e. whether the surrounding oxides bond to another Si atom or to an Al atom. Five possibilities exist: $Si(OSi)_4$; $Si(OSi)_3(OAl)$; $Si(OSi)_2(OAl)_2$; $Si(OSi)(OAl)_3$; $Si(OAl)_4$. The higher the fraction of Si containing multiple OAl bonds, for a given stoichiometric mixture, the greater degree that the Al and Si sources have been intimately mixed during the course of the reaction.

EXAMPLE 2
Preparation of an Aluminosilicate Gel Using the Dual Stream Mixer/Reactor of the Invention A solution containing sodium silicate and a small amount of aluminum (2.68 mol Si/liter, 0.048 mol Al/liter, 5.76 mol Na/liter) was added to the reservoir of the first pump. A solution of $Al_2(SO_4)_3$ (1.40 mol Al/liter) was added to the reservoir of the second pump. These solutions at ambient temperature were pumped at 14–15 kpsi operating pressure, at 290–300 ml/minute each, in the high pressure dual stream reactor (FIG. 2C). The product discharged at the exit of the chamber had a pH of 7.2 and was a thick, white gel. This gel was washed with distilled, de-ionized water to remove sodium sulfate salts, filtered, and subsequently dried at 110–120° C. This material was then analyzed by $^{29}$Si NMR. The NMR spectrum is provided in FIG. 9. The $^{29}$Si spectrum consists of a broad peak centered at −87.15 ppm with a half width at half maximum of 14.24 ppm. The Si/Al of the recovered solid as measured by ICP was 2.37. The concentration of the residual Na and S were 0.4 wt. % and <0.01 wt. %, respectively.

Figure 9:
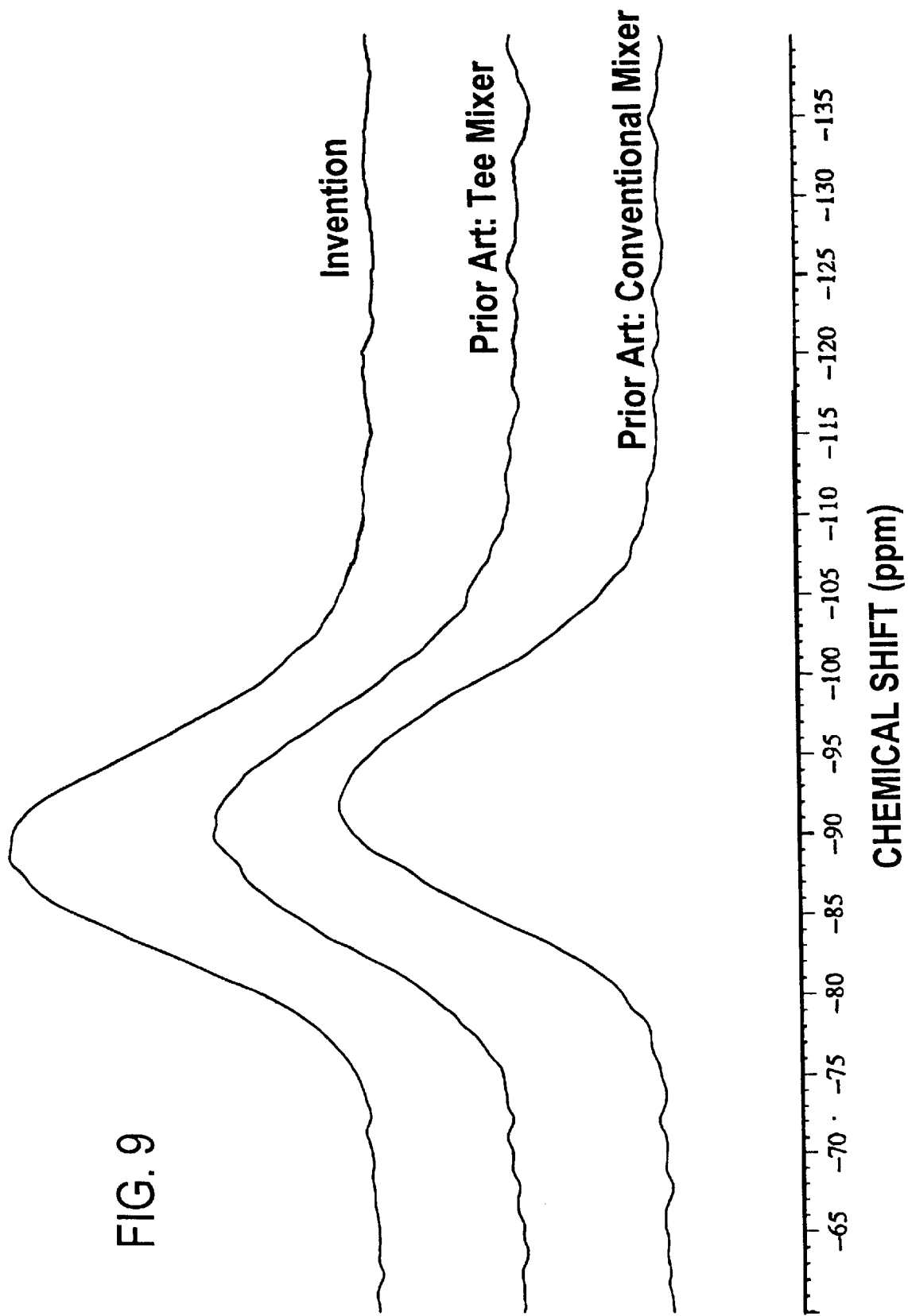
FIG. 9 is an NMR spectrum of the products of Example 2 and Comparative Examples 2A and 2B.

COMPARATIVE EXAMPLE 2A
Preparation of an Aluminosilicate gel via Drop-wise Addition of an Al Source to a Si Source Using a Conventional Mixing Device A solution containing sodium silicate and a small amount of aluminum (385 ml, 2.68 mol Si/liter, 0.048 mol Al/liter, 5.76 mol Na/liter) was added to a beaker equipped with an overhead stirrer. A solution of $Al_2(SO_4)_3$ (301 ml, 1.80 mol Al/liter) was added dropwise with vigorous stirring from the overhead stirrer, resulting in the appearance of solid formation. The aluminum sulfate addition was continued until a final pH of 6.5–7.0 was achieved in the solution. At this point, the final Si/Al molar ratio was calculated to be approximately 1.84. The solids were filtered on No. 3 Whatman filter paper in the buchner funnel, washed thoroughly with distilled, de-ionized water, and dried at 110–120° C. The dry material was analyzed by $^{29}$Si NMR and the corresponding spectrum is shown in FIG. 9. The $^{29}$Si spectrum consists of a broad peak centered at −91.82 ppm with a half width at half maximum of 16.08 ppm. The atomic Si/Al ratio of the recovered solid was measured by Inductive Coupled Plasma (ICP) at 1.90 in good agreement with the calculated value.

COMPARATIVE EXAMPLE 2B
Preparation of an Aluminosilicate gel via Drop-wise Addition of an Al Source to a Si Source Using a Tee Mixing Device A solution containing sodium silicate (2.68 mol Si/liter) was prepared and added to the first container. A solution of $Al_2(SO_4)_3$ (1.40 mol Al/liter) was prepared and added to a second container. The solutions were fed to the opposite inlets of the ¼" Swagelok Tee device by peristaltic pumps. The product was discharged through the third, perpendicular arm of the Tee into the collection vessel. The solutions were pumped simultaneously into the Tee mixer at a flow rate of 150 ml/minute each. Flows were adjusted slightly to provide a pH of the exit slurry near 7.0. Control of the pH was difficult because the exit material was thick and did not easily flow, resulting in pressure buildup in the tubing and somewhat erratic flows. Final collection pH was approximately 7.9. The collected material was filtered, washed with distilled, deionized water, and dried. The $^{29}$Si NMR spectrum of the dry material is shown in FIG. 9. It consists of a broad peak centered at −90.36 ppm with a half width at half maximum of 17.06 ppm. The Si:Al of the recovered solid as measured by ICP was 1.52.

The comparative NMR data from Example 2 and Comparative Examples 2A and 2B are provided in tabular form in Table 1. Comparison of the NMR peak maxima suggests that greater incorporation of Al within the Si matrix is accomplished with the dual stream reactor, even though the overall concentration of Al in the precipitated solid is lower. This is evidenced by the less negative value of the peak maximum of the Si resonance indicative of a greater number of OAl bonds on average around Si atoms. In addition, the peak width for this sample is the smallest which points to a narrower distribution of $Si(OAl)_x$ species and thus a more homogeneous sample. By comparison, the sample made with the tee reactor produces a maximum at −90.36 ppm, with a broader tail extending toward the region of $Si(OSi)_4$, even though the sample contains more Al. The sample made with conventional mixing, carried out in semi-batch fashion, has a maximum at −91.82 ppm, clearly shifted toward the less Al substituted Si species, again despite the higher overall Al content in the product. The use of the dual pump reactor clearly provides superior mixing of the Si and Al components and thus the resulting product has a more uniform composition.

TABLE 1

| Example No. | Reactor Type | Si/Al ratio (mol/mol) | $^{29}$Si NMR peak Maximum, (ppm) | $^{29}$Si NMR FWHM, (ppm) |
|---|---|---|---|---|
| 2 | Dual Stream | 2.37 | −87.15 | 14.24 |
| 2A | Semi-batch | 1.90 | −91.82 | 16.08 |
| 2B | Tee | 1.52 | −90.36 | 17.06 |

In Example 3, an aluminosilicate gel with Al/Si ratio of 3 was prepared from particulate oxide precursors such as colloidal suspensions or sols. Such a material upon calcination at high temperature leads to the formation of the crystalline mullite structure, stoichiometry $3Al_2O_3 \cdot 2SiO_2$. Separate phases of $Al_2O_3$ and $SiO_2$ are usually formed in the as-prepared solid, and mullite forms via the diffusion of one phase into the other at high temperatures. Enhanced intimate mixing of the Al and Si oxide sol particles should produce smaller discrete domains of separate phase silica and alumina phases in the as-formed product, facilitating the thermal transformation of the solid to 100% mullite at lower temperature.

Starting materials included: colloidal $SiO_2$-20 nm particles, 32 wt. % solids (Nalco); colloidal $Al_2O_3$-50 nm particles, 20 wt % solids (Nyacol); aqueous ammonium hydroxide. The colloidal $SiO_2$ solution was diluted to allow for mixing of equal volumes of the silica and alumina colloidal solutions at the prescribed stoichiometry (3Al:1Si). A preliminary experiment in which the two colloidal solutions were combined revealed that the final pH was below the target value of 8.5, leading to poor gelation of the mixed solution. By titrating the product solution with aqueous ammonia, it was possible to raise the pH of the mixture to 8.5, whereupon the gelation did proceed. The same amount of aqueous ammonia established by the titration procedure was added to a new batch $SiO_2$ colloidal sol, which was then used in the comparative mixing experiments with the colloidal alumina sol. By such a method, the correct stoichiometry could be produced, while achieving the correct final pH.

EXAMPLE 3
Synthesis of Aluminosilicate Mullite Precursors Using the Dual Stream Mixer/Reactor According to the Invention 500 ml of a diluted colloidal $SiO_2$ sol and 2 ml of 30 wt % aqueous ammonia were added to the reservoir of the first pump. To the reservoir of the second pump was added 500 ml of a colloidal $Al_2O_3$ sol, undiluted. The atomic Al/Si ratio of the combined solutions was 3:1. These solutions were mixed in the reaction chamber that is shown in FIG. 2C. The solutions were fed at a rate of 300 ml/minute (each), and with a pressure drop of between 10 kpsi and 11 kpsi across the reaction chamber. A viscous, gel-like product was discharged through the outlet of the interaction chamber. This material was recovered and dried at 120° C. without washing. It is referred to as product A.

COMPARATIVE EXAMPLE 3A
Synthesis of Aluminosilicate Mullite Precursors Using Conventional Mixing Device Solutions of colloidal $SiO_2$ sol and aqueous ammonia, and colloidal $Al_2O_3$ sol were prepared and added to two separate beakers as described in Example 9. The atomic Al/Si ratio of the combined solutions was 3:1. The two solutions were fed at equal rates using a peristaltic pump into a third beaker, which was equipped with a magnetic stir bar to provide mixing. The solutions were added until the initial beakers were depleted. The pH was maintained at 8.5. Although the mixture was a gel initially, it settled after mixing for approximately 2 minutes. The product was dried in an oven at 120° C. for several hours and is referred to as product B.

The uniformity of composition of products A and B was determined qualitatively by monitoring the transition to the mullite phase as a function of temperature with powder X-ray diffraction analysis. The dried powder was place in a holder, and mounted onto a "hot stage" of the X-ray diffractometer. The sample was heated to the desired temperature and held at that temperature for 10 minutes before collecting the X-ray spectrum. For efficiency and speed of analysis, only the region of the X-ray spectrum that reveals the most intense, characteristic peaks of mullite was scanned. The comparative spectra are provided in FIGS. 10A and 10B for products A and B respectively. A small amount of mullite is formed at 1000° C. in both samples which indicates some degree of molecular scale mixing. However, the X-ray intensity of the mullite peaks of sample A (dual stream reactor) continues to grow as temperature increases to 1450° C., revealing the two sharp, well resolved peaks characteristic of mullite. In the case of product EB (conventional mixing), the X-ray intensity of the mullite peaks increases only slightly and an additional broad peak centered at about 24.7 degrees 2θ appears. This peak is not associated with mullite, rather it is believed to be a specific phase of quartz. The lack of growth of the mullite phase from product B (made in a stirred vessel) as calcination temperature increases shows that product B is less uniform in composition than product A prepared with the dual stream reactor.

The following examples demonstrate the ability of the dual stream high pressure reactor to produce a product of greater phase purity as compared to a product produced by conventional precipitation. The specific Examples 4 and 5 are for the precipitation of copper/zinc/aluminum hydroxycarbonate.

Copper-based catalysts co-precipitated with zinc and optionally aluminum oxides find use in low temperature water gas shift reaction and in methanol synthesis. Typical preparations of such materials involve the precipitation of the mixture cf metal cations from nitrate solutions by mixing with sodium carbonate or bicarbonate solutions. The zinc and aluminum are usually included (as nitrates which co-precipitate with the copper) to enhance the activity and stability of the copper particles in the final catalyst. Precipitates from mixed nitrate solutions typically contain at least one of two phases and frequently both: hydrotalcite, which contains aluminum, and malachite, which does not. The proportion of these phases depends on the stoichiometry of the metal ions in solution, the choice of precipitating agent, the method of mixing, and mixing intensity during the precipitation. Precipitation mixtures are frequently characterized by composition, i.e. the ratio of copper to zinc, and the atomic percent aluminum in the mixture (basis: Cu+Zn+Al=100%). For Al in the range 20–33 atomic %, pure hydrotalcite can be produced theoretically, although this is mitigated by factors such as the Cu/Zn ratio and the quality of mixing in the reactor. The open literature teaches that precipitates from nitrate solutions with 25 atomic percent aluminum and sodium bicarbonate slightly in excess of that needed to completely neutralize the nitrate ions contain only hydrotalcite and/or malachite as X-ray detectable crystalline phases. With conventional mixing, Cu, Zn, and Al nitrate solutions with atomic ratios of copper to zinc less than or equal to 1.0 precipitated only hydrotalcite. Solutions with ratios between 1.0 and 9.0 precipitated mixtures of hydrotalcite and malachite impurity, with increasing proportions of malachite as the Cu/Zn ratio increases. Solutions with ratios above 9.0 yielded only malachite.

Figure 11A:
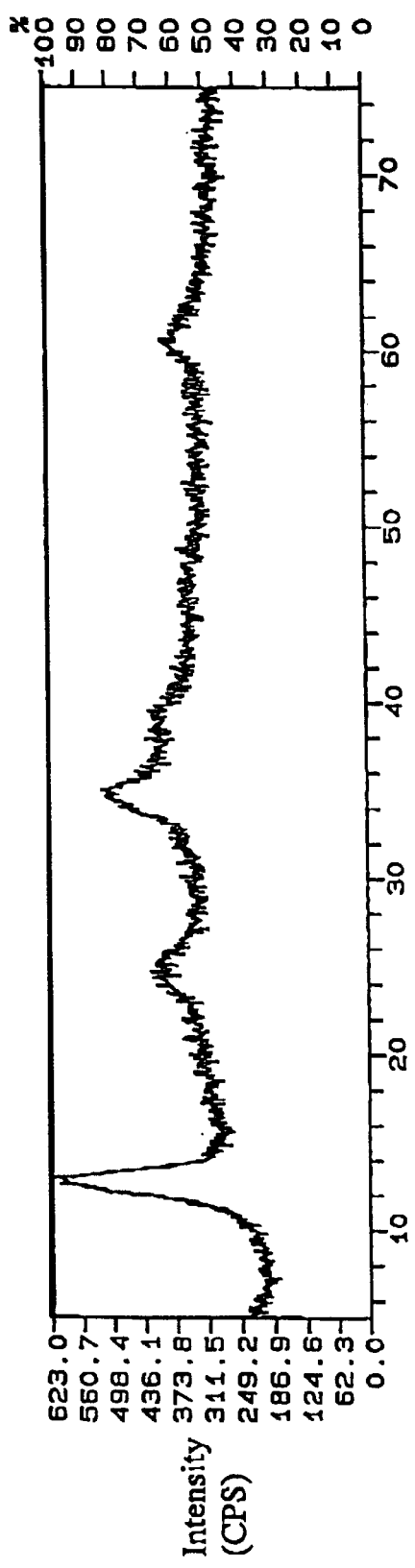
FIGS. 11A and 11B are x-ray spectra of the products of Example 4 and Comparative Example 4A, respectively.
Figure 11B:
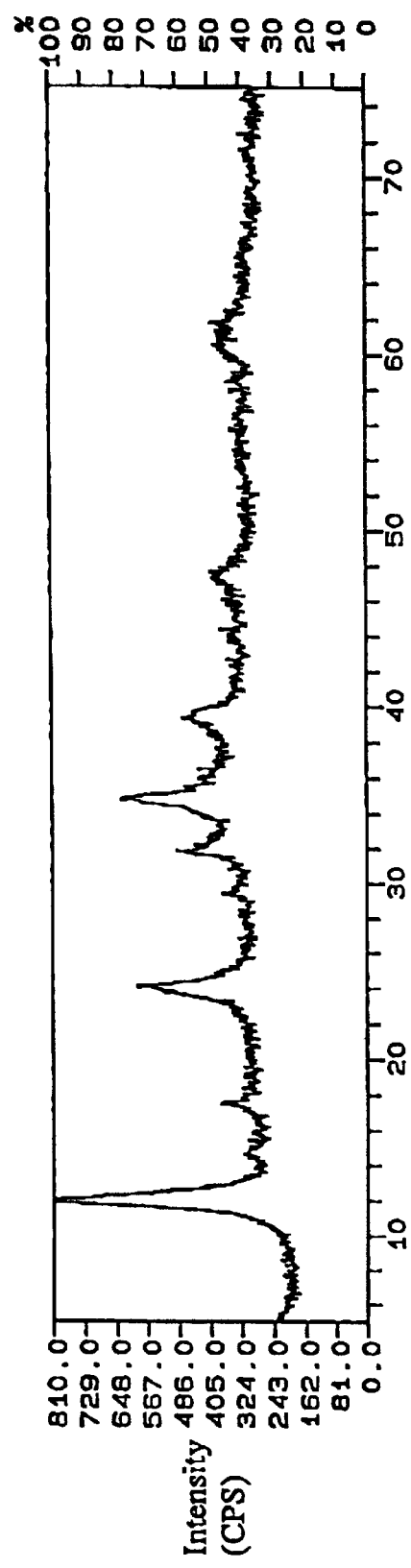

EXAMPLE 4
Precipitation of Cu/Zn/Al Hydroxycarbonate with 25% Al and Cu/Zn=3.0 Using the Dual Stream Mixer/Reactor of the Invention A solution comprising 0.35 M $Al(NO_3)_3.9H_2O$, 0.80 M $Cu(NO_3)_2.-2.5H_2O$, and 0.27 M $Zn(NO_3)_2.6H_2O$ was added to the reservoir of the first pump and a solution containing 3.3 M $NaHCO_3$ was added to the reservoir of the second pump. The temperature of both solutions was maintained at 60° C. The pump pressures were equal to 15 kpsi during operation, corresponding to a flow rate of 300 ml/min for each pump. The collected slurry product was mixed in a stirred vessel at 60° C. for at least 1 hour (aging). Then, the solids were filtered, washed with water to remove sodium and nitrate ions, and dried at 95° C. An X-ray powder diffraction pattern of the solid product is presented in FIG. 11A and shows that the solid product is pure hydrotalcite, without any malachite impurity.

Figure 10B:
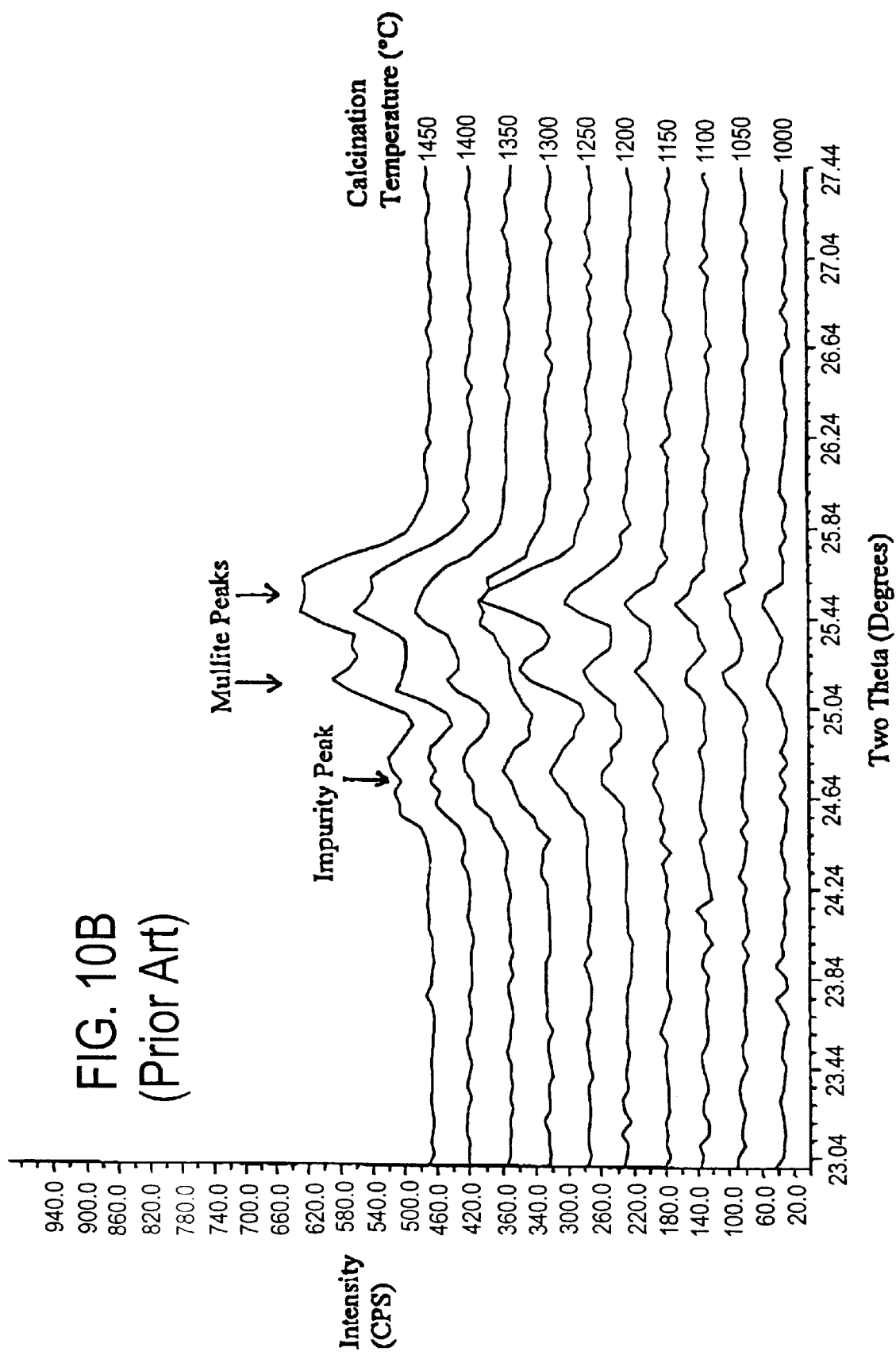

COMPARATIVE EXAMPLE 4A
Precipitation of Cu/Zn/Al Hydroxycarbonate with 25% Al and Cu/Zn=3.0 Using Conventional Mixing Device A solution comprising 0.35 M $Al(NO_3)_3.9H_2O$, 0.80 M $Cu(NO_3)_2.-2.5H_2O$, and 0.27 M $Zn(NO_3)_2.6H_2O$ was added to an equal volume of solution containing 3.3 M $NaHCO_3$ in a vessel equipped with vigorous magnetic stirring. Both solutions were warmed to 60° C. and the temperature of the mixture was kept constant at 60° C. during the precipitation. After aging of the slurry, the solids were filtered, washed, and dried as in Example 4. The X-ray powder diffraction pattern of the solid product is shown in FIG. 10B. The product is a mixture of hydrotalcite and a significant amount of malachite impurity.

EXAMPLE 5
Precipitation of Cu/Zn/Al Hydroxycarbonate with 25% Al and Cu/Zn=9.0 Using the Dual Stream Mixer/Reactor of the Invention A solution comprising 0.35 M $Al(NO_3)_3.9H_2O$, 0.35 M $Cu(NO_3)_2.-2.5H_2O$, and 0.11 M $Zn(NO_3)_2.6H_2O$ was added to the reservoir of the first pump and the solution containing 3.3 M $NaHCO_3$ was added to the reservoir of the second pump. The temperature of both solutions was maintained at 60° C. The pump pressures were equal to 15 kpsi during operation, corresponding to a flow rate of 300 ml/min for each pump. The collected slurry product was aged as in Example 4. Then, the solids were filtered, washed and dried at 95° C. as in Example 4. An X-ray powder diffraction pattern of the solid product is presented in FIG. 11A and shows that the solid product contained malachite and a significant amount of hydrotalcite.

Figure 12A:
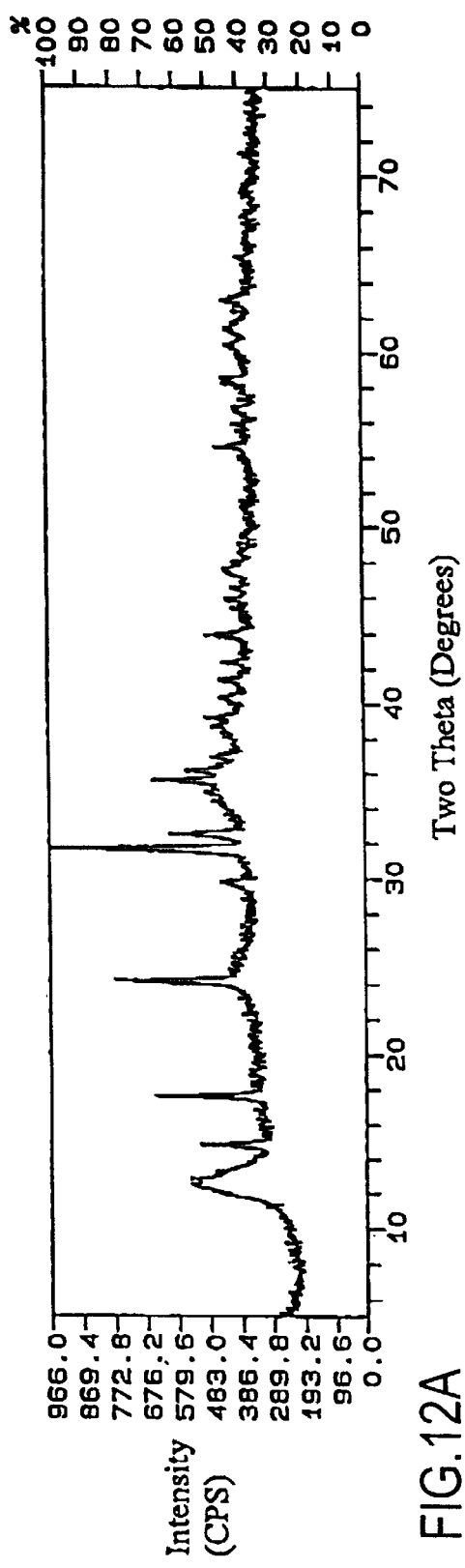
FIGS. 12A and 12B are x-ray spectra of the products of Example 5 and Comparative Example 5A, respectively.
Figure 12B:
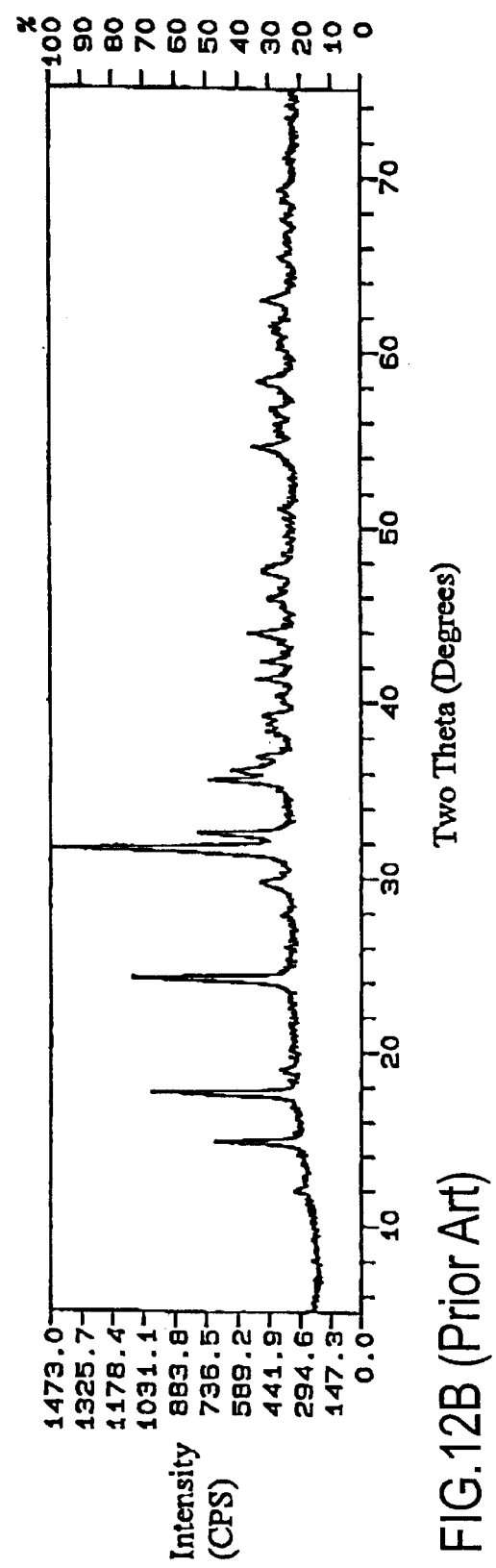

COMPARATIVE EXAMPLE 5A
Precipitation of Cu/Zn/Al Hydroxycarbonate with 25% Al and Cu/Zn=9.0 Using Conventional Mixing Device A solution comprising 0.35 M $Al(NO_3)_3.9H_2O$, 0.95 M $Cu(NO_3)_2.-2.5H_2O$, and 0.11 M $Zn(NO_3)_2.6H_2O$ was added to an equal volume of solution containing 3.3 M $NaHCO_3$ in a vessel equipped with vigorous magnetic stirring. Both solutions were warmed to 60° C. and the temperature of the mixture was kept constant at 60° C. during the precipitation. After aging of the slurry, the solids were filtered, washed, and dried as in Example 4. The dry product contained only malachite as shown by the X-ray powder diffraction pattern in FIG. 12B.

The next examples are provided to show the ability of the high pressure dual stream reactor to reduce crystal size and simultaneously improve phase purity of a product as compared to other mixing devices. The specific examples 6, 6A, and 6B are for the precipitation of copper/zinc/aluminum hydroxycarbonate.

EXAMPLE 6
Precipitation of the Cu—Zn—Al Hydrotalcite Phase using the Dual Stream Mixer/Reactor According to the Invention As described earlier in Examples 4–5, the intensity of mixing affects the ratio of hydrotalcite to malachite in the product; malachite appears despite the fact that the Cu—Zn—Al stoichiometry could in principle produce a pure hydrotalcite phase. A solution of mixed Cu, Zn, and Al nitrates, with atomic ratio 48:27:25 (Cu/Zn=1.8), was precipitated with an equal volume of solution containing sodium carbonate as in Example 4. In separate experiments, the precipitation was carried out using two different reaction chambers shown in FIG. 2A and in FIG. 2C, respectively. The operating pressure of each pump was approximately 15 kpsi, corresponding to a flow rate of 300 ml/min. The product was aged at 60° C. for two hours, filtered, and washed to remove sodium ions. The recovered solids were dried at 95° C. The X-ray diffraction analysis of the solids showed the samples were a mixture of malachite and hydrotalcite. The ratio of hydrotalcite to malachite was determined by the ratio of areas of the X-ray peaks at 11° and 17.5°, respectively. The hydrotalcite average crystal size was measured from the line broadening of the most intense peak. The results are presented in Table 2.

COMPARATIVE EXAMPLE 6A
Precipitation of the Cu—Zn—Al Hydrotalcite Phase Via Conventional Mixing Device Solutions were prepared as described above in Example 6. The metal nitrate solution and the sodium carbonate solution were mixed by direct addition into a beaker that was stirred vigorously with a magnetic bar. The product was aged, filtered, washed, and dried as in Example 6. The dry solid was also analyzed by X-ray diffraction and the results are presented in Table 2.

COMPARATIVE EXAMPLE 6B
Precipitation of the Cu—Zn—Al Hydrotalcite Phase Using a Single Pump Microfluidizer™ Device Solutions were prepared as described above in Example 6. The metal nitrate solution and the sodium carbonate solution were added into the inlet reservoir of a single stream Microfluidizer device that was operated at 15 kpsi. The product was aged, filtered, washed, and dried as in Example 6. The dry solid was also analyzed by X-ray diffraction and the results are presented in Table 2.

TABLE 2

| Mixing Device | Hydrotalcite/ malachite ratio | Hydrotalcite Crystallite Size, nm |
| --- | --- | --- |
| Conventional mixing | 13 | 28 |
| Single Stream Microfluidizer ® Processor | 16 | 48 |
| Dual Stream Reactor, FIG. 2A | 46 | 15 |
| Dual Stream Reactor, FIG. 2C | 91 | 8 |

Results in Table 2 show that the use of the dual stream reaction chamber leads to a product not only of greater phase purity toward the hydrotalcite, but also of smaller hydrotalcite crystallite size by a factor of 2–3 as compared to other mixing devices. In addition, the dual stream reaction chamber geometry shown in FIG. 2C leads to the smallest crystal size and the highest hydrotalcite phase purity.

Example 7 is provided to show the ability of the high pressure dual stream reactor to reduce crystal size of a precipitated product as compared to other mixing devices. The precipitation of barium sulfate (barite) is examined in this example.

EXAMPLE 7
Precipitation of Barite Using the Dual Stream Mixer/Reactor of the Invention Barium sulfate is a simple salt which can be precipitated by the mixing of barium nitrate with sodium sulfate. The crystallite size of the product is well known to be based on the quality of mixing employed during the precipitation. Experiments were carried out using solutions to produce either $20 \times 10^{-3}$ M or $5 \times 10^{-3}$ M $BaSO_4$ slurry product. The barium nitrate and sodium sulfate solutions were added to the reservoirs of the first and second pump, respectively. The operating pressure of the pumps was equal to 15 kpsi, corresponding to a flow rate of 300 ml/minute for each pump. The reaction chamber shown in FIG. 2C was used in this experiment. The crystal size of the barite was measured in solution by laser light scattering, and the values are presented in Table 3.

COMPARATIVE EXAMPLE 7A
Precipitation of Barite Via Conventional Precipitation The solutions of barium nitrate and sodium sulfate were added simultaneously to a beaker that was equipped with a magnetic stirring bar to provide mixing. The precipitation produced a product that had a barite concentration equal to $20 \times 10^{-3}$ M. The average crystal size of the barite was measured at 5.9 μm in solution by laser light scattering (Table 3).

COMPARATIVE EXAMPLE 7B
Precipitation of Barite Using a Tee Mixer

The solutions of barium nitrate and sodium sulfate were fed to the opposite inlets of a laboratory Tee device with peristaltic pumps at the same flow rate as in Example 7. The precipitated product was discharged through the third perpendicular arm of the device into a beaker. Two separate precipitation experiments were carried out at $20 \times 10^{-3}$ M and $5 \times 10^{-3}$ M barite concentrations, respectively. The average crystal size of the barite was measured as in Example 7 and the results are shown in Table 3.

TABLE 3

| Mixing Device | Crystal Size (μm), $BaSO_4$ conc. = $20 \times 10^{-3}$ M | Crystal Size (μm), $BaSO_4$ conc. = $5 \times 10^{-3}$ M |
| --- | --- | --- |
| Conventional Mixing | 5.9 | — |
| Tee Mixer | 0.5 | 3.0 |
| Dual Stream Reactor | 0.25 | 0.32 |

The use of the dual stream high pressure reactor leads to a reduction in crystal size of $BaSO_4$ by a factor of at least two as compared to other mixing devices.

What is claimed is:

1. A process for the production of a solid state, particulate product by combining in a reaction chamber two or more liquid reactant streams containing chemical reactants which, upon reaction, form a solid particulate product of uniformly sized particles in less than 10 micron diameter size range, said process comprising:
   a) pressurizing each separate liquid reactant stream to a pressure of at least 8000 psi;
   b) passing said liquid streams into a reaction chamber as high velocity liquid jets which collide with each other at an anile ranging from about 10° to about 350° and react to form a solid product; and
   c) recovering the precipitated or solid particulate product from the reaction chamber at atmospheric pressure.

2. The process of claim 1, wherein the size distribution between the largest and smallest particles, measured in linear dimension is no greater than a factor of about 5.

3. A process for the production of a gel product formed by the reaction of two or more chemical components producing a precipitated product in a reaction chamber where the chemical reaction components are provided to the reaction chamber as two or more liquid reactant streams containing said components, which upon reaction form a gel product of uniform composition, said process comprising:
   a) pressurizing each separate liquid reactant stream to a pressure of at least 8000 psi;
   b) passing said liquid streams into a reaction chamber as high velocity liquid jets which collide with each other at an angle ranging from about 10° to about 350° and react to form the gel product; and
   c) recovering the gel product from the reaction chamber at atmospheric pressure.

4. A process for the production of a precipitated product of high phase purity wherein separate liquid-based streams comprising one or more reactants in solution and precipitating agent in dispersed or dissolved form in liquid media are combined on a continuous basis and wherein the composition and phase purity of the precipitated product are controlled by maintaining a constant pH in the combined liquid streams at the time of mixing and precipitation, which comprises:
   a) initially adjusting the pH of each liquid stream to afford the desired pH on mixing;
   b) pressurizing each separate liquid stream containing a reactant or precipitating agent, respectively, at the adjusted pH, to a pressure of at least 8000 psi;
   c) passing said liquid streams into a reaction chamber as high velocity liquid jets which collide with each other at an angle ranging from about 10° to about 350° and react to form the precipitated product; and
   d) recovering the precipitated product from the reaction chamber at atmospheric pressure.

5. The process of claim 4, wherein the precipitated product is made up of at least 90 percent by weight of a single phase.

6. A process for the production of mixed metal and metal oxide solid state materials of small crystallite size and desired phase purity by co-precipitation of two or more metals from metal salt solutions with a precipitating agent wherein separate liquid-based streams comprising dispersions or solutions of each metal salt and a precipitating agent are combined on a continuous basis with the potential to form two or more precipitated product phases depending on the intensity of mixing and presence of homogeneous mixtures of the metal salt components at supersaturated conditions which comprises:
   a) pressurizing each separate liquid stream containing a metal salt or a precipitating agent to a pressure of at least 8000 psi;

b) passing said liquid streams into a reaction chamber as opposed high velocity liquid jets which collide with each other at an angle ranging from about 10° to about 350° and react to form the mixed metal and metal oxide solid state materials; and c) recovering the mixed metal and metal oxide solid state materials from the reaction chamber at atmospheric pressure.

7. A process for the production of a copper/zinc/aluminum hydrotalcite catalyst by co-precipitation of copper, zinc and aluminum salts to form a particulate catalyst which is enriched in the hydrotalcite phase relative to the malachite phase and which is made up of crystallites having an average size below about 20 nm which comprises:

a) preparing separate liquid solutions containing metal salts of copper, zinc and aluminum and of a precipitating agent;

b) pressurizing each separate liquid solution to a pressure of at least 8000 psi;

c) passing said pressurized liquid streams into a reaction chamber as high velocity liquid jets which collide with each other at an angle ranging from about 10° to about 350° and react to form the mixed metal and metal oxide solid state materials; and d) recovering the particulate catalyst product from the reaction chamber at atmospheric pressure.

8. A process for the preparation of a precipitated aluminosilicate gel formed by precipitation reaction of a silicon-containing compound and an aluminum-containing compound wherein the atomic ratio of Si/Al in the gel, defined as the number of Al atoms which are coordinatively bonded to Si via an oxygen atom, closely approximates the atomic ratio of Si/Al in the silicon-containing and aluminum containing compounds used as starting materials which comprises:

a) pressurizing each separate liquid solution or suspension to a pressure of A <at least 8000 psi;

b) passing said pressurized liquid solutions or suspensions into a reaction chamber as high velocity liquid jets which collide with each other at an angle ranging from about 10° to about 350° and react to form the gel product; and c) recovering the gel product from the reaction chamber at atmospheric pressure.

* * * * *

UNITED STATES PATENT AND TRADEMARK OFFICE
CERTIFICATE OF CORRECTION

PATENT NO.    : 6,159,442
DATED         : December 12, 2000
INVENTOR(S)   : Thumm et al.

It is certified that error appears in the above-identified patent and that said Letters Patent is hereby corrected as shown below:

Column 1
Line 3, insert:

-- This invention was made with United States Government support under Cooperative Agreement #70NANB5H1067 awarded by the National Institute of Standards and Technology Advanced Technology Program. The United States Government has certain rights in this invention. --

Column 6,
Line 3, after "of" please insert -- α --.
Line 3, after "angle" (second occurrence) please insert -- α --.
Line 3, delete [anile] and please insert -- angle α --.
Line 42, after "angle" please insert -- α --.

Column 26,
Lines 26 and 47, after "angle" please insert -- α --.

Column 27,
Line 23, after "angle" please insert -- α --.
Line 23, after "angle" please insert -- α --.

Column 28,
Line 14, after "of" please delete [A<].
Line 18, after "angle" please insert -- α --.

Signed and Sealed this

Second Day of July, 2002

*Attest:*

*Attesting Officer*

JAMES E. ROGAN
*Director of the United States Patent and Trademark Office*